(12) United States Patent
Inokuchi et al.

(10) Patent No.: US 7,334,266 B2
(45) Date of Patent: Feb. 19, 2008

(54) REPRODUCTION CONTROL METHOD, PROGRAM AND RECORDING MEDIUM

(75) Inventors: Tatsuya Inokuchi, Tokyo (JP); Asako Kawakami, Tokyo (JP); Shinobu Hayashi, Shizuoka (JP)

(73) Assignee: Sony Corporation, Tokyo (JP)

( * ) Notice: Subject to any disclaimer, the term of this patent is extended or adjusted under 35 U.S.C. 154(b) by 857 days.

(21) Appl. No.: 10/473,527

(22) PCT Filed: Jan. 28, 2003

(86) PCT No.: PCT/JP03/00758

§ 371 (c)(1),
(2), (4) Date: Sep. 30, 2003

(87) PCT Pub. No.: WO03/065365

PCT Pub. Date: Aug. 7, 2003

(65) Prior Publication Data

US 2004/0103301 A1 May 27, 2004

(30) Foreign Application Priority Data

Feb. 1, 2002 (JP) ............................. 2002-025625

(51) Int. Cl.
*G06F 21/22* (2006.01)
*H04L 9/00* (2006.01)
*H04K 1/00* (2006.01)
*G11C 7/00* (2006.01)

(52) U.S. Cl. .................... 726/26; 713/193; 705/57
(58) Field of Classification Search .................. None
See application file for complete search history.

(56) References Cited

U.S. PATENT DOCUMENTS 6,622,249 B1 * 9/2003 Komuro et al. ............... 726/31

| | | | | |
|---|---|---|---|---|
| 6,959,090 B1 * | 10/2005 | Alve et al. | .................. | 380/277 |
| 6,976,162 B1 * | 12/2005 | Ellison et al. | .............. | 713/156 |
| 6,980,387 B2 * | 12/2005 | Yoshizawa et al. | ........... | 360/69 |
| 7,099,491 B2 * | 8/2006 | Takaku | ........................ | 382/100 |
| 2002/0169971 A1 * | 11/2002 | Asano et al. | ................ | 713/193 |
| 2003/0120926 A1 * | 6/2003 | Fukushima et al. | ......... | 713/176 |

(Continued)

FOREIGN PATENT DOCUMENTS

| JP | 10-187434 | 7/1998 |
|---|---|---|
| JP | 2000-149416 | 5/2000 |
| JP | 2000-276834 | 10/2000 |
| JP | 2000-298926 | 10/2000 |
| JP | 2001-312286 | 11/2001 |

(Continued)

*Primary Examiner*—Christopher Revak
(74) *Attorney, Agent, or Firm*—Finnegan, Henderson, Farabow, Garrett & Dunner, L.L.P.

(57) ABSTRACT

A reproduction control method adopted by an information-processing apparatus such as a personal computer for the purpose of protecting copyrights imposes a restriction on an operation carried out by a media reproduction apparatus such as a disc drive apparatus to reproduce musical data or the like (from a recording medium mounted on the media reproduction apparatus). A command issued by the processing main member of the information-processing apparatus (including application programs and an OS) to the media reproduction apparatus such as the disc drive apparatus to read out data recorded on the recording medium in a predetermined format is monitored. If the issuance of a command to read out data recorded in a predetermined format is confirmed, a copyright protection process is carried out to protect a copyright. The copyright protection process is a process to prohibit or conditionally permit a suck-up operation (to transfer the musical data from the recording medium to the personal computer).

48 Claims, 14 Drawing Sheets

U.S. PATENT DOCUMENTS

| | | | |
|---|---|---|---|
| 2005/0060570 A1* | 3/2005 | Ueda | 713/200 |
| 2005/0066173 A1* | 3/2005 | Bergh et al. | 713/176 |
| 2006/0121918 A1* | 6/2006 | Nakakita et al. | 455/458 |
| 2006/0135209 A1* | 6/2006 | Nakakita et al. | 455/561 |
| 2006/0285465 A1* | 12/2006 | Ichinose et al. | 369/53.31 |
| 2006/0291361 A1* | 12/2006 | Ichinose et al. | 369/59.25 |

FOREIGN PATENT DOCUMENTS

| | | |
|---|---|---|
| JP | 2001-320363 | 11/2001 |
| WO | WO 99/59049 | 11/1999 |

* cited by examiner

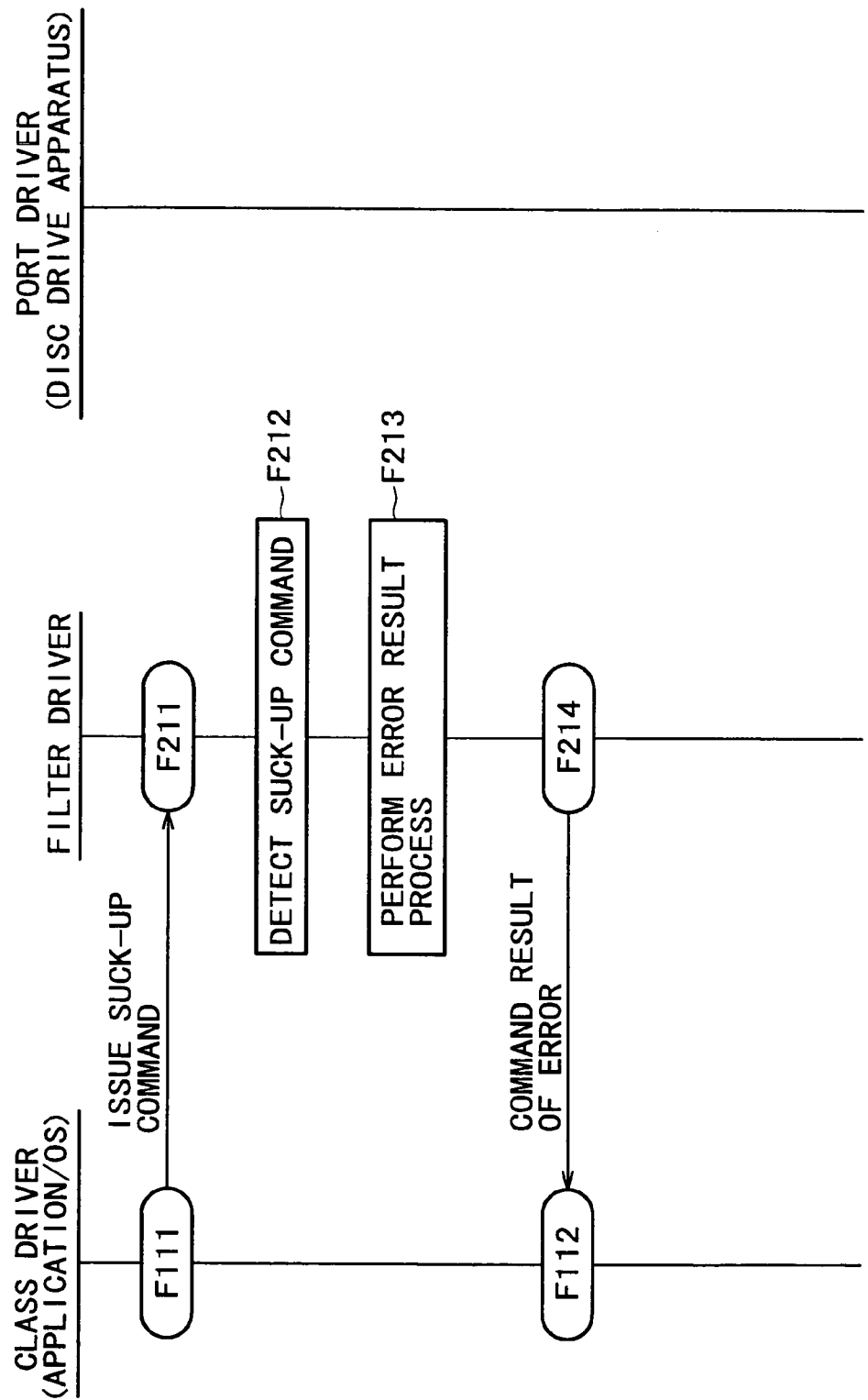

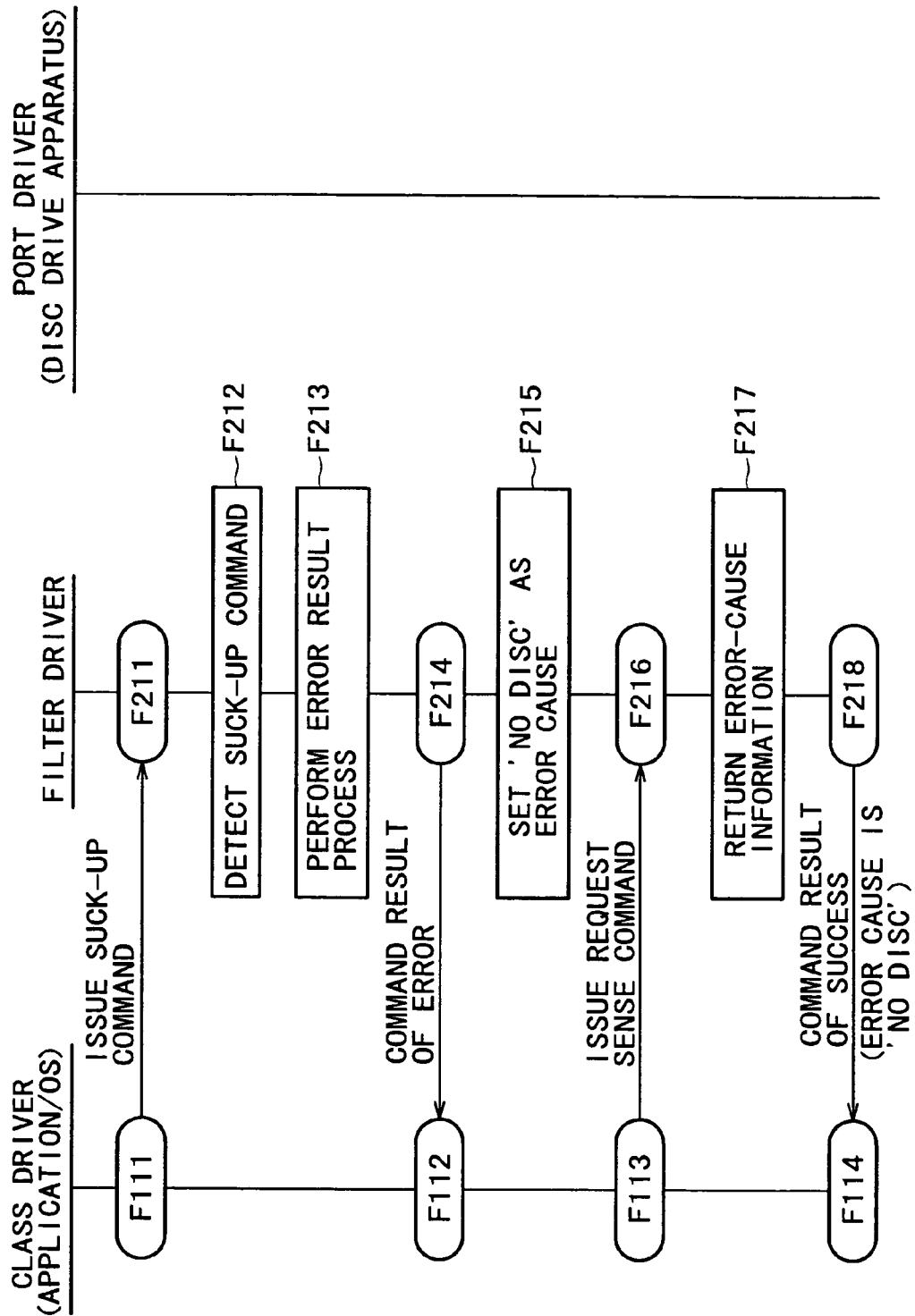

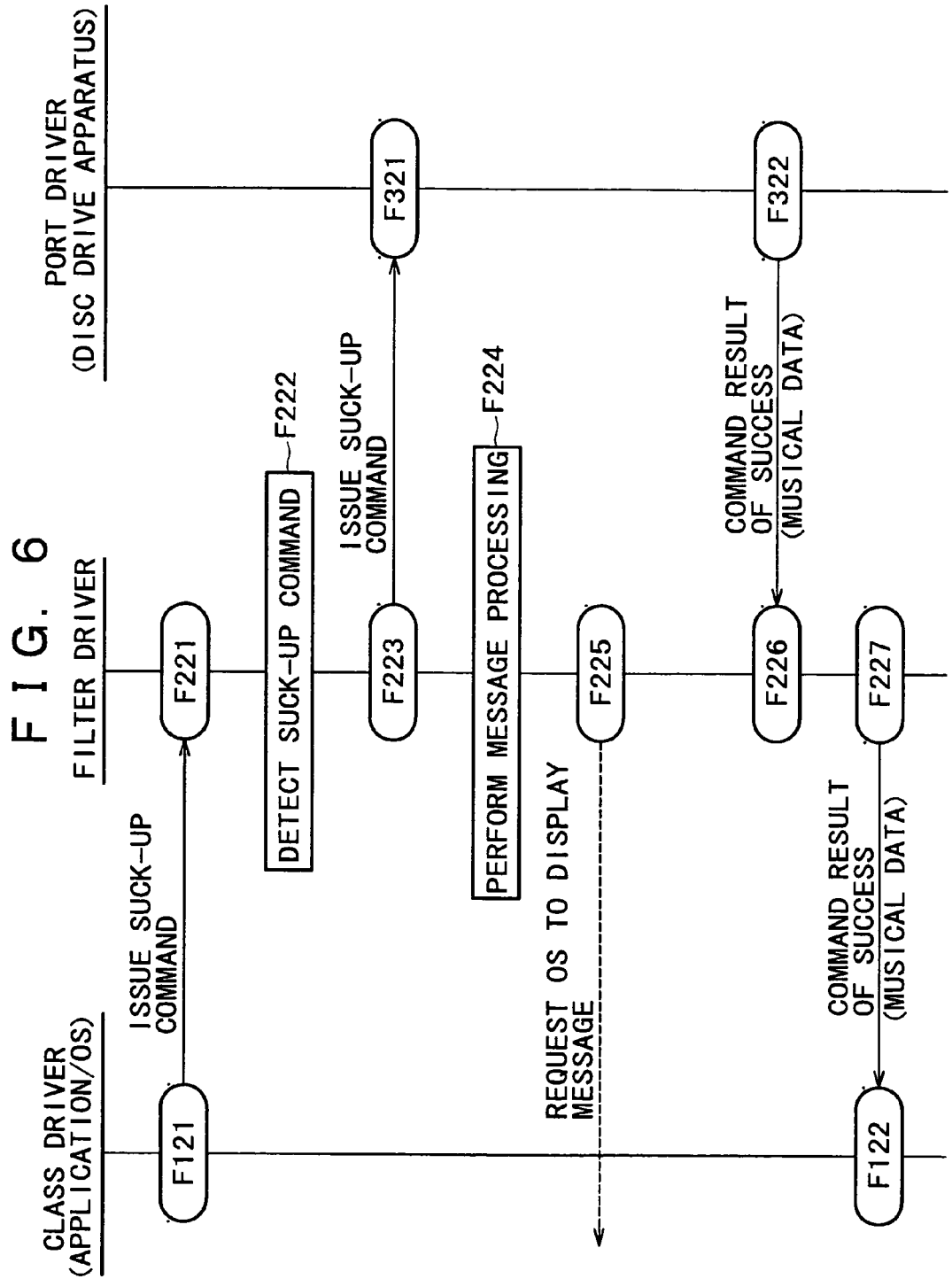

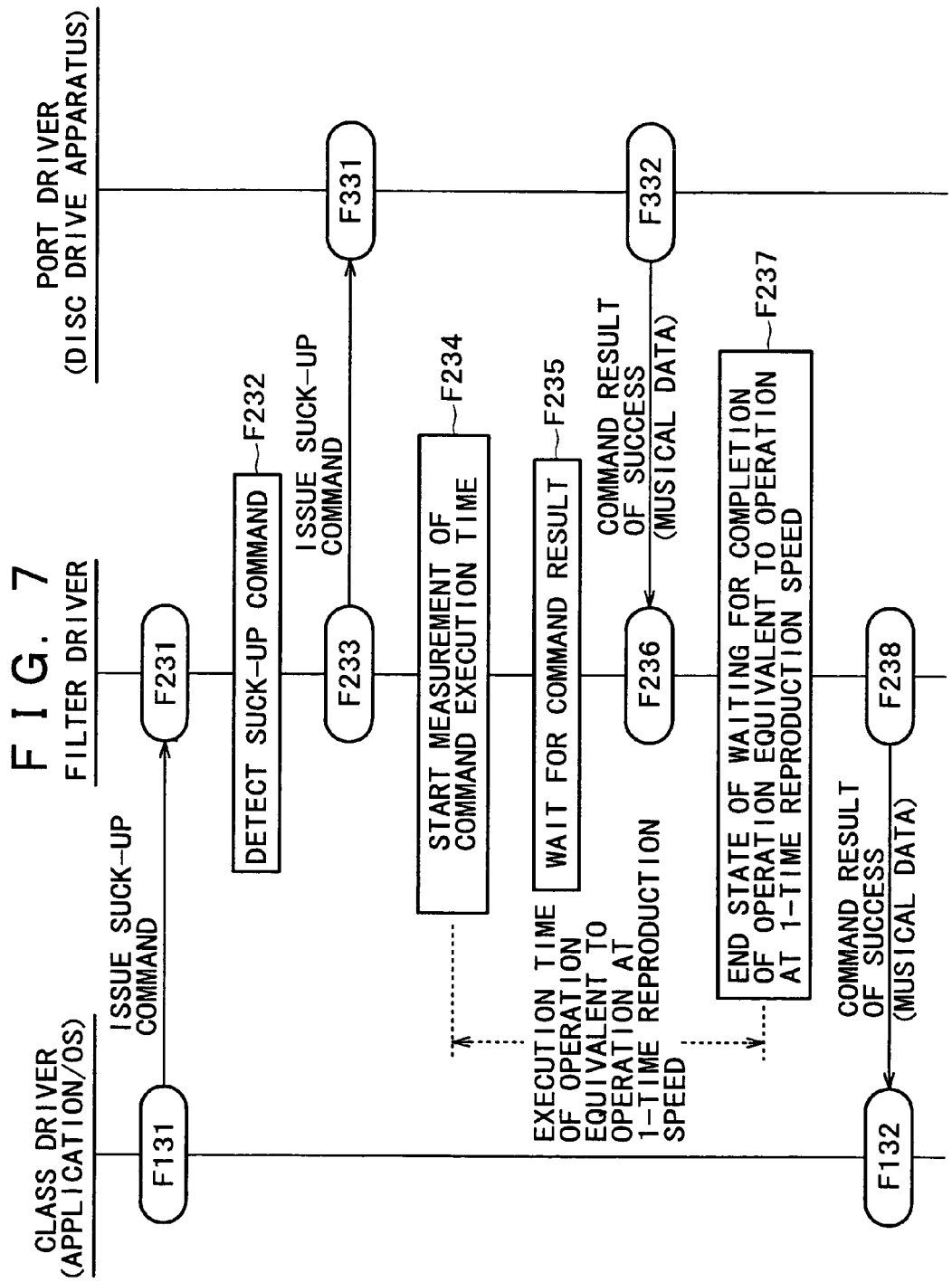

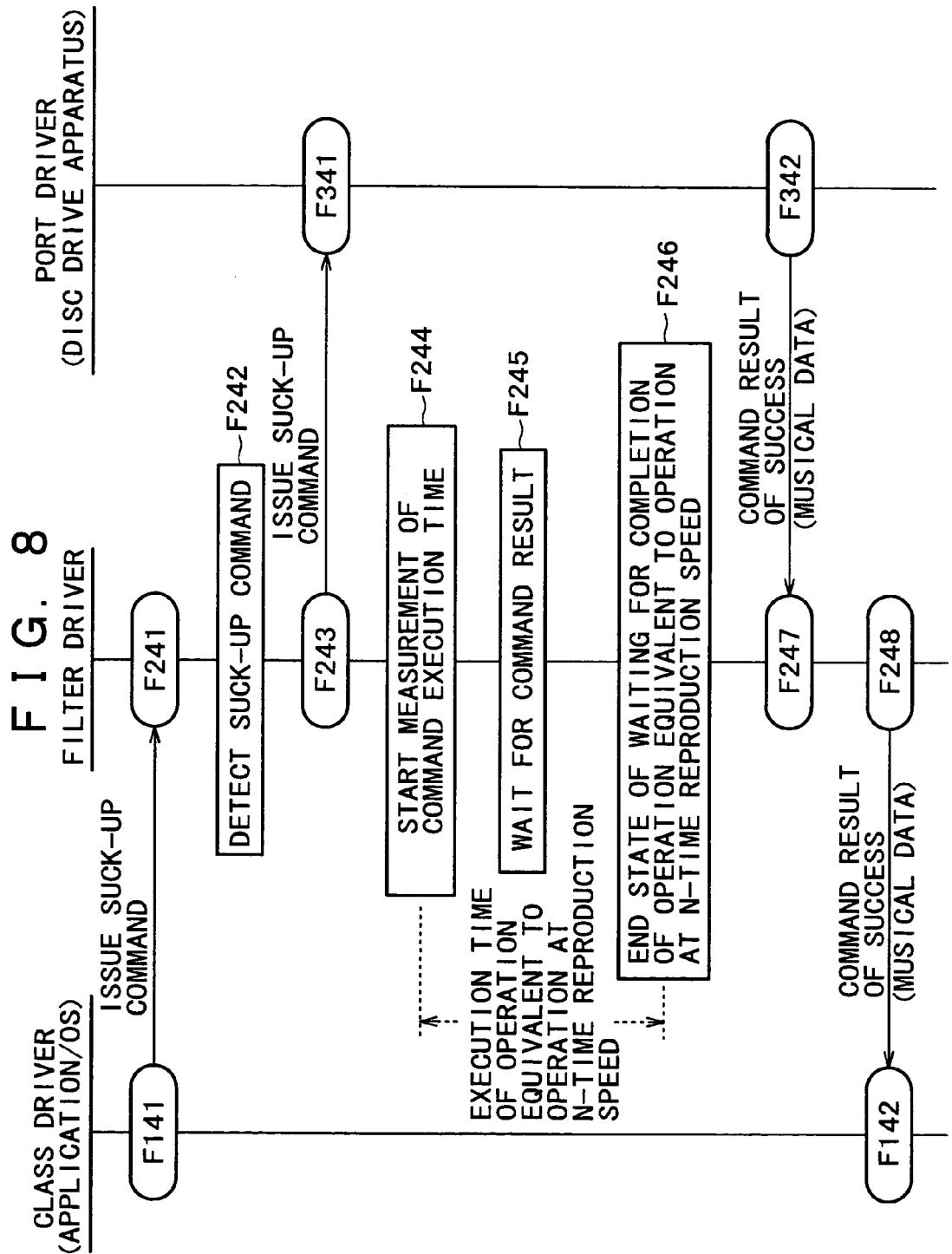

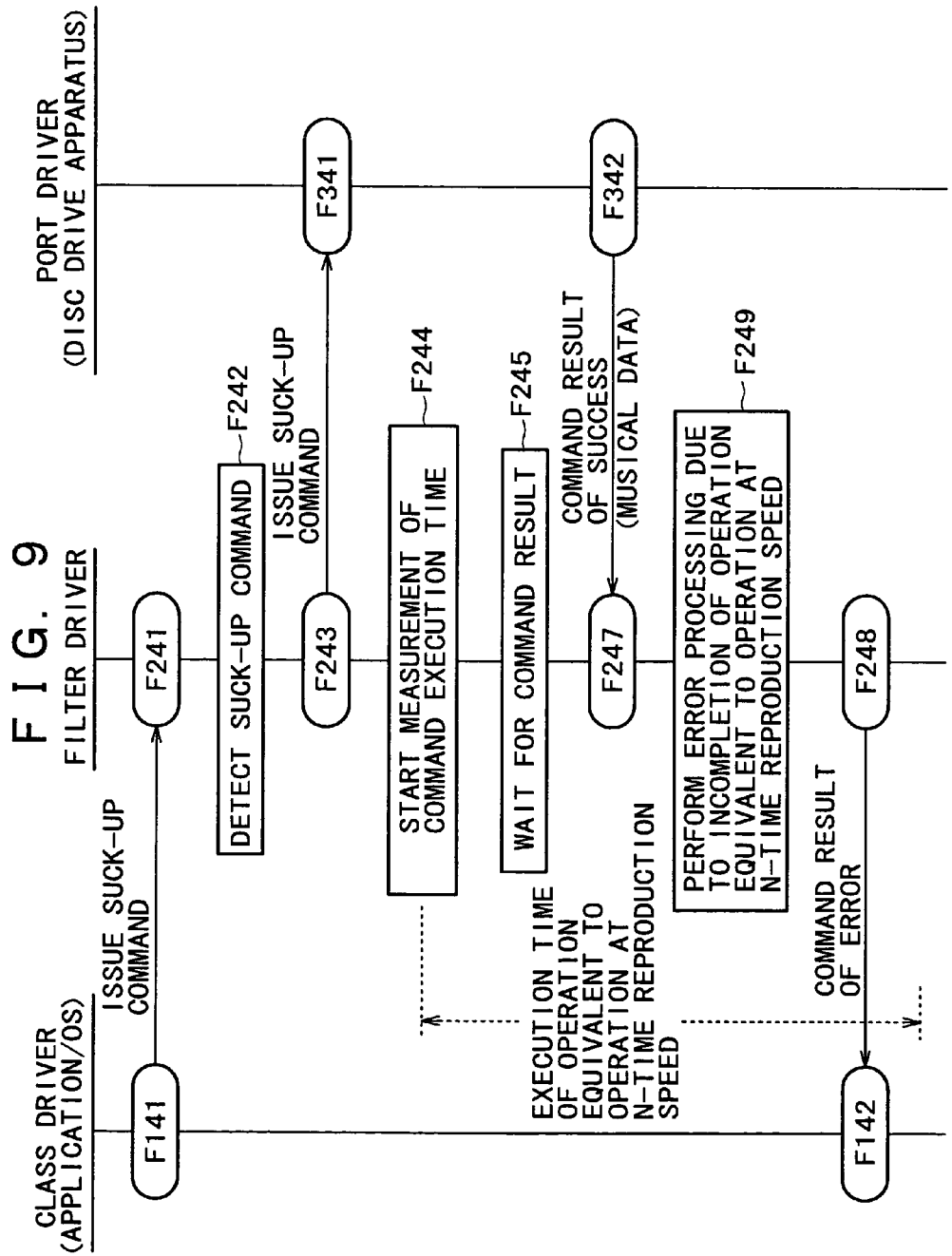

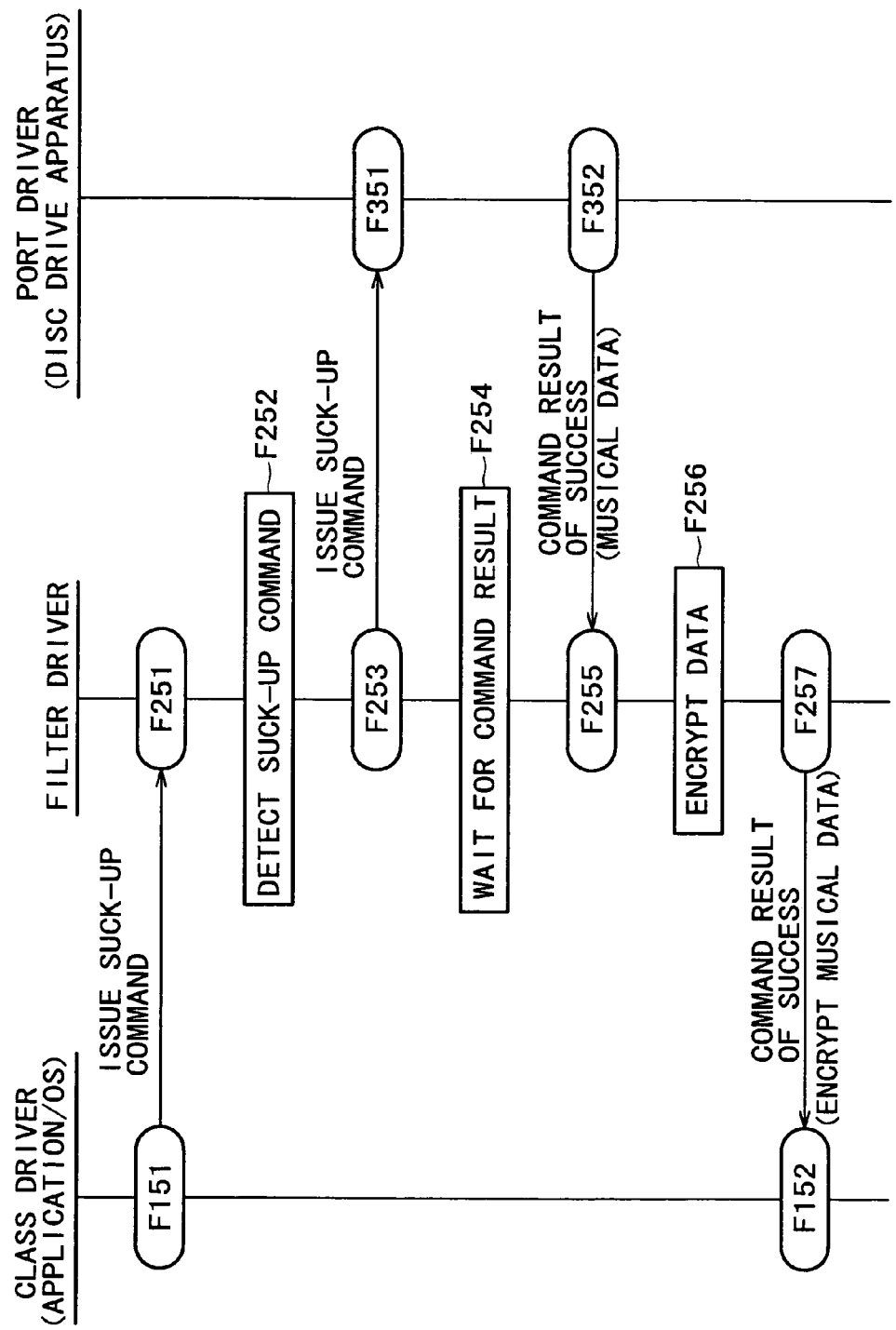

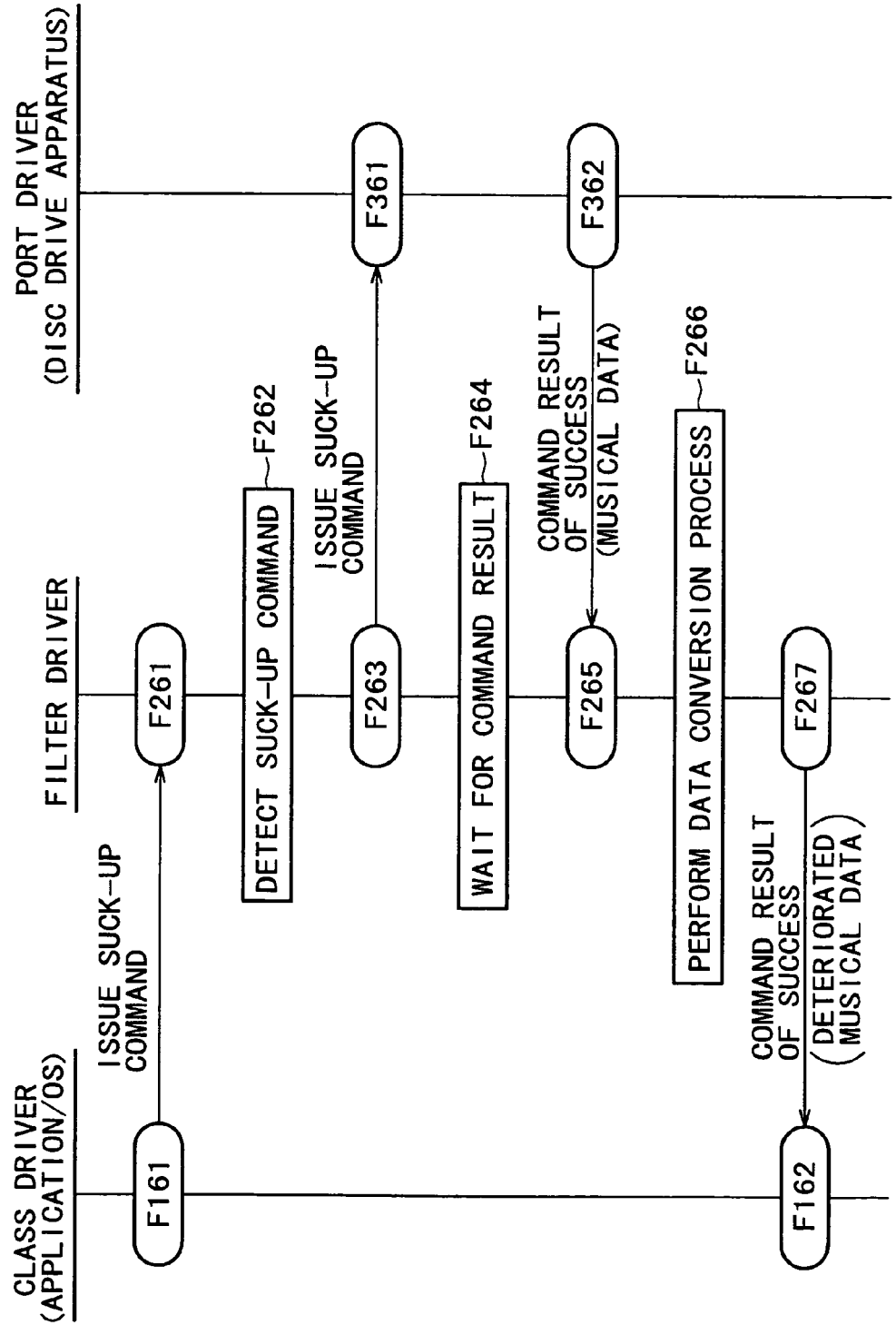

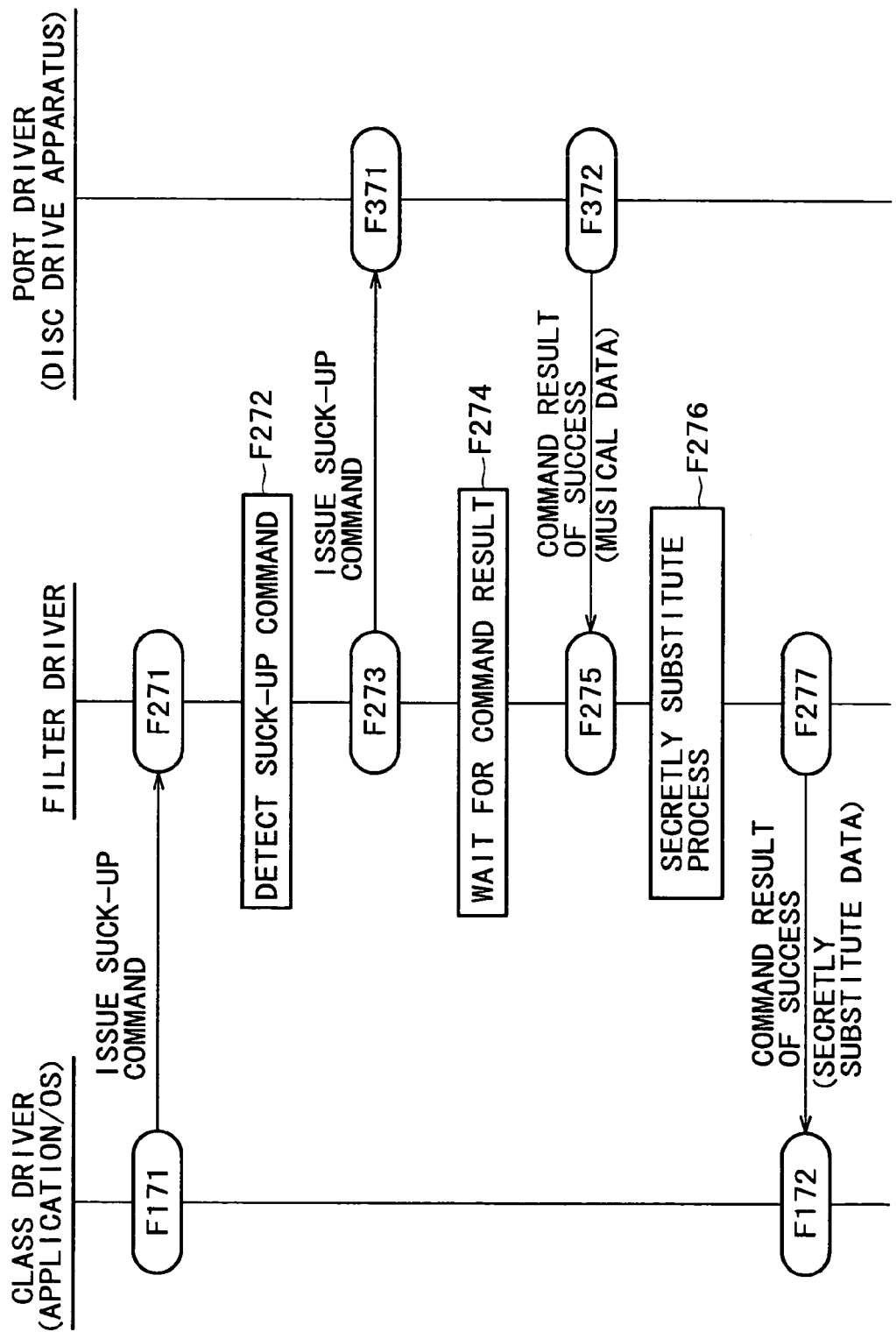

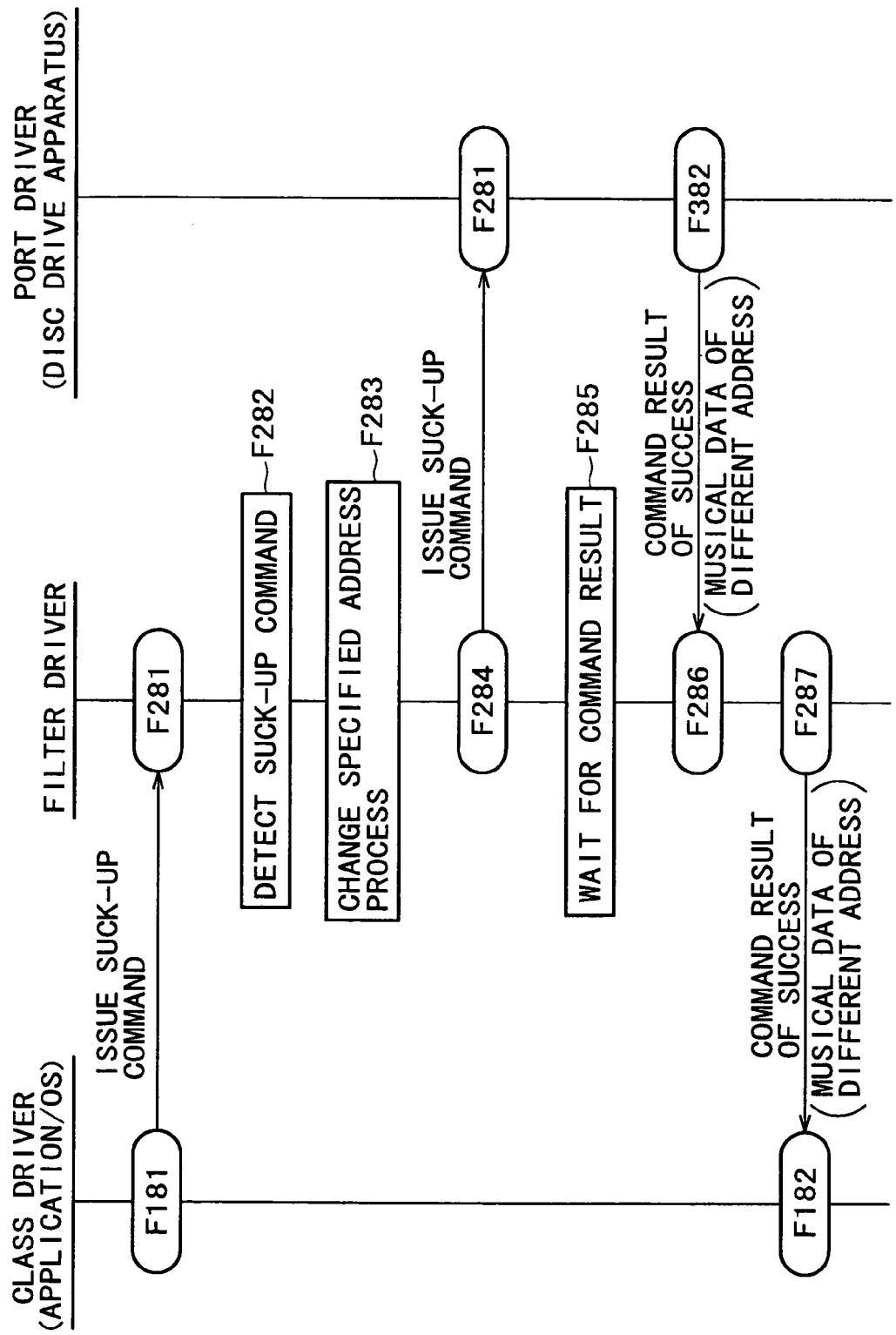

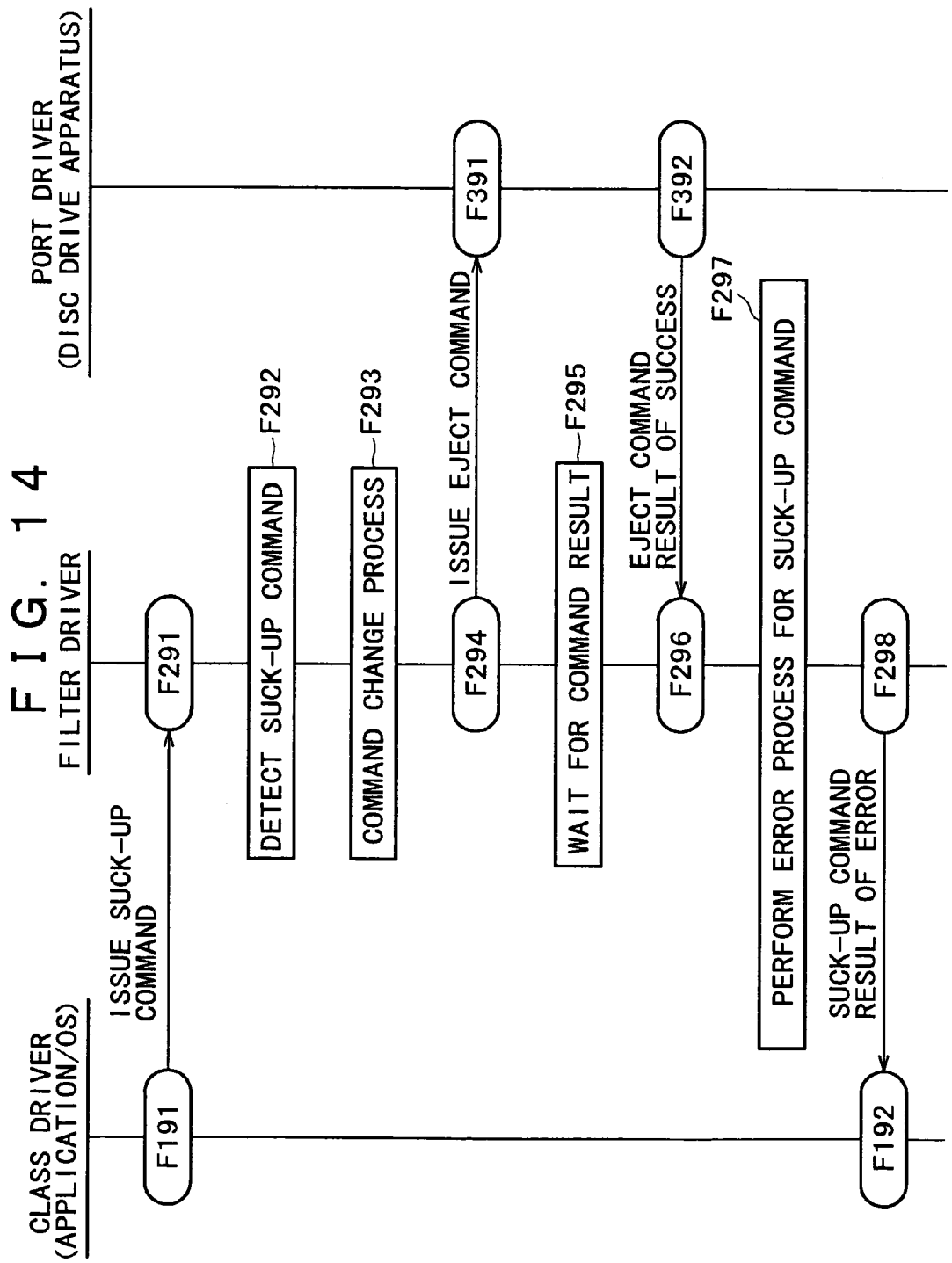

REPRODUCTION CONTROL METHOD, PROGRAM AND RECORDING MEDIUM

TECHNICAL FIELD

The present invention relates to a reproduction control method applicable to an information-processing apparatus (such as a personal computer) including an embedded media reproduction apparatus or connected to a media reproduction apparatus, a program implementing the reproduction control method and a recording medium for storing the program.

BACKGROUND ART

It is illegal to copy a content such as a piece of music recorded for sales on disc media such as a CD (Compact Disc) and a DVD (Digital Versatile Disc), which are provided for music, if there is no permission given by the author of the content except that the content is copied exclusively for private use.

In recent years, however, discs onto which data can be written by adoption of a color-changing technique or a phase-changing technique have becoming popular, putting the user in a condition making the user capable of copying a content with ease. Examples of such discs are CD-R, CD-RW, DVD-RAM, DVD-R, DVD-RW and DVD+RW.

In addition, a disc drive apparatus (or a media reproduction apparatus) embedded in or connected to a personal computer is capable of recording data onto or reading out data from a variety of discs conforming to a CD system and/or a DVD system. Examples of such a disc drive apparatus are a CD-ROM drive and a DVD drive. Furthermore, the disc drive apparatus is capable of carrying out reproduction operations at a high speed such as an 8-time reproduction speed, a 16-time reproduction speed and 40-time reproduction speed.

At the present time, a CD player or the like sold as an audio commodity adopts an copyright protection function called a SCMS (Serial Copy Management System), which normally allows a copy operation only one time at a 1-time reproduction speed.

Nevertheless, a personal computer and a disc-drive apparatus embedded therein or used as a peripheral unit thereof do not adopt the copyright protection function so that, practically, copy operations can be carried out an unlimited number of times. An example of the disc-drive apparatus is a CD-ROM drive.

Furthermore, in recent years, a CD-ROM drive, which is embedded in or connected to a personal computer and capable of recording data onto a CD-R and a CD-RW, has become a standard commodity. Of course, the DVD, the DVD-R and the like have also become all but standard products.

In consequence, the user has entered a state in which it is possible to transfer musical data recorded on a disc such as a CD provided for musical use to a hard disc typically by using a personal computer and then carry out a recording operation to copy the data to media such as a CD-R with ease and in a short period of time.

In particular, the fact that recording and reproduction operations carried out on an optical disc at a high speed allow copy operations to be carried out in a short period of time offers convenience to an unauthorized party selling copied discs. Such high-speed recording and reproduction operations increase the number of so-called piracies, which ignore copyrights.

From the facts described above, there has been raised a demand for restrictions of operations to reproduce contents such as musical data by using a media reproduction apparatus such as a disc drive apparatus in conjunction with an information-processing apparatus such as a personal computer.

DISCLOSURE OF INVENTION

It is thus an object of the present invention addressing the problems described above to provide a reproduction control method capable of imposing restrictions on operations to reproduce contents such as musical data by using a media reproduction apparatus such as a disc drive apparatus in conjunction with an information-processing apparatus such as a personal computer, provide a program implementing the reproduction control method and provide a recording medium for storing the program.

The reproduction control method provided by the present invention is a reproduction control method adopted by an information-processing apparatus to reproduce data from recording media mounted on a media reproduction apparatus embedded in or connected to the information-processing apparatus. The reproduction control method provided by the present invention is characterized in that the reproduction control method is implemented by execution of: a monitoring procedure for monitoring a command issued by the processing main member of the information-processing apparatus such as an application program or an OS to the media reproduction apparatus to read out data recorded on the recording media in a predetermined format; and a copyright protection execution procedure for carrying out a process to protect a copyright in case the issuance of a command to read out data recorded on the recording media in a predetermined format has been confirmed by the monitoring procedure.

In addition, the reproduction control method is also provided with a determining procedure for determining as to whether or not the process to protect a copyright is required on the basis of the contents or the type of the recording media mounted on the media reproduction apparatus and, if a result of the determination formed by the determining procedure indicates that the process to protect a copyright is required, the monitoring procedure and the copyright protection execution procedure are executed.

The copyright protection execution procedure serves as a procedure for transmitting a read error signal to the processing main member without passing on the command to read out data from the recording media to the media reproduction apparatus.

As an alternative, the copyright protection execution procedure serves as a procedure for transmitting a read error signal and a signal indicating that the recording media has not been mounted on the media reproduction apparatus to the processing main member without passing on the command to read out data from the recording media to the media reproduction apparatus.

As another alternative, the copyright protection execution procedure serves as a procedure for passing on the command to read out data from the recording media to the media reproduction apparatus and transmitting a signal to the processing main member to request the processing main member that a message be output.

As a further alternative, the copyright protection execution procedure serves as a procedure for passing on the command to read out data from the recording media to the media reproduction apparatus and passing the data received from the media reproduction apparatus to the processing main member after the lapse of a predetermined wait time.

As a still further alternative, the copyright protection execution procedure serves as a procedure for passing on the command to read out data from the recording media to the media reproduction apparatus and passing the data received from the media reproduction apparatus to the processing main member only if the average speed to read out the data is lower than a predetermined speed.

As a still further alternative, the copyright protection execution procedure serves as a procedure for passing on the command to read out data from the recording media to the media reproduction apparatus after converting the contents of the command and passing the data read out by the media reproduction apparatus in accordance with a command obtained as a result of conversion to the processing main member.

As a still further alternative, the copyright protection execution procedure serves as a procedure for passing on the command to read out data from the recording media to the media reproduction apparatus after transforming the command into another command and transmitting a read error signal to the processing main member.

As a still further alternative, the copyright protection execution procedure serves as a procedure for passing on the command to read out data from the recording media to the media reproduction apparatus and converting all or a portion of the data received from the media reproduction apparatus prior to transmission to the processing main member.

In this case, the data conversion process is a process to convert the data into data in a state that allows the original data to be recovered by carrying out predetermined processing or into data in an irrecoverable state.

The process to convert the data into other data in a state that allows the original data to be recovered by carrying out predetermined processing is a posit-ion transformation process executed by carrying out predetermined processing or an encryption process executed by carrying out processing using a predetermined encryption key. As the encryption key or a part of the encryption key, a value unique to a particular apparatus is used.

The process to convert original data into other data in an irrecoverable state is a process to deteriorate the sound quality of the original data, which is represented by an audio signal, or a process to secretly substitute the other data for the original data read out from the recording media.

The program provided by the present invention is a program for driving the information-processing apparatus to execute the reproduction control method.

Further, the recording medium provided by the present invention is a recording medium for storing the program.

From the copyright-protection point of view, there is raised a biggest problem that musical data recorded on a disc such as a CD-DA is sucked up by a personal computer (that is, reproduced by the personal computer and recorded into a storage medium such as an HDD) at a high speed and then transferred from the recording medium to an output recording medium such as a CD-R for recording the data.

There is thus raised a need for a proper solution to solve the above problem by imposing some restrictions on operations to reproduce data having a predetermined format (such as CD-DA data or PCM audio data) from a disc drive apparatus embedded in or connected to an information-processing apparatus such as a personal computer.

That is to say, copyrights can be protected by, for example, prohibiting an operation to suck up data, issuing a warning of such an operation, imposing a restriction on the speed to suck up data and converting data in accordance with the reproduction control method.

In addition, by implementing such control of reproduction operations by execution of a program in an information-processing apparatus, it is possible to realize more universal protection of copyrights than a copy protection technique implemented by devising the recording media (such as a CD) itself. That is to say, the control of reproduction operations is capable of effectively functioning on a CD not adopting any copy protection technique. An example of such a CD is a CD produced and sold in the past.

BRIEF DESCRIPTION OF DRAWINGS

FIG. 4 is an explanatory diagram showing operation sub-embodiment 1 with a restriction imposed on a reproduction process in accordance with the embodiment;

FIG. 5 is an explanatory diagram showing operation sub-embodiment 1' with a restriction imposed on a reproduction process in accordance with the embodiment;

FIG. 6 is an explanatory diagram showing operation sub-embodiment 2 with a restriction imposed on a reproduction process in accordance with the embodiment;

FIG. 7 is an explanatory diagram showing operation sub-embodiment 3 with a restriction imposed on a reproduction process in accordance with the embodiment;

FIG. 8 is an explanatory diagram showing operation sub-embodiment 4 with a restriction imposed on a reproduction process in accordance with the embodiment;

FIG. 9 is an explanatory diagram showing operation sub-embodiment 4 with a restriction imposed on a reproduction process in accordance with the embodiment;

FIG. 10 is an explanatory diagram showing operation sub-embodiment 5 with a restriction imposed on a reproduction process in accordance with the embodiment;

FIG. 11 is an explanatory diagram showing operation sub-embodiment 6 with a restriction imposed on a reproduction process in accordance with the embodiment;

FIG. 12 is an explanatory diagram showing operation sub-embodiment 7 with a restriction imposed on a reproduction process in accordance with the embodiment;

FIG. 13 is an explanatory diagram showing operation sub-embodiment 8 with a restriction imposed on a reproduction process in accordance with the embodiment; and FIG. 14 is an explanatory diagram showing operation sub-embodiment 9 with a restriction imposed on a reproduction process in accordance with the embodiment.

BEST MODE FOR CARRYING OUT THE INVENTION

Figure 1:
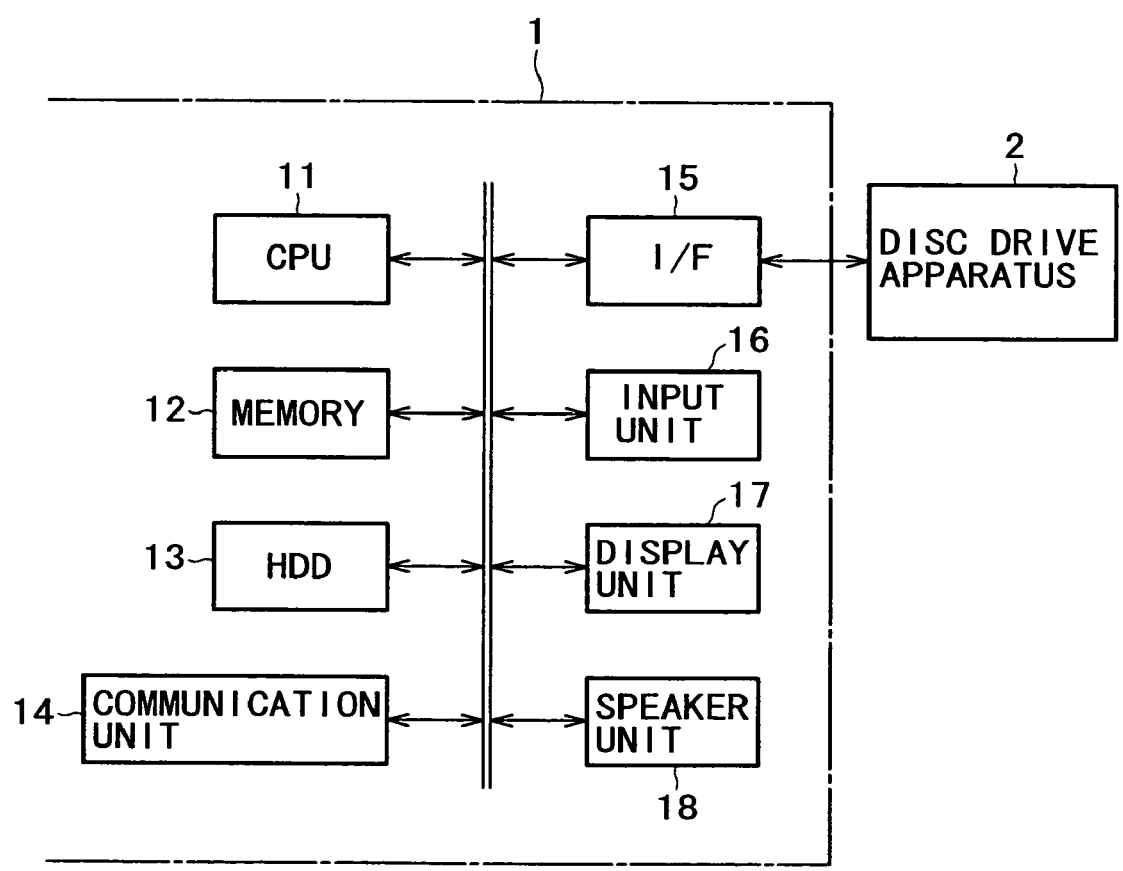
FIG. 1 is an explanatory diagram showing the hardware structure of an embodiment of the present invention.

A preferred embodiment of the present invention is explained in paragraphs arranged in the following order:
1. Hardware Configuration
2. Software Configuration
3. Operation Sub-embodiment with No Reproduction Restrictions
4. Operation Sub-embodiment 1 with Reproduction Restrictions 5. Operation Sub-embodiment 2 with Reproduction Restrictions
6. Operation Sub-embodiment 3 with Reproduction Restrictions
7. Operation Sub-embodiment 4 with Reproduction Restrictions
8. Operation Sub-embodiment 5 with Reproduction Restrictions
9. Operation Sub-embodiment 6 with Reproduction Restrictions
10. Operation Sub-embodiment 7 with Reproduction Restrictions
11. Operation Sub-embodiment 8 with Reproduction Restrictions
12. Operation Sub-embodiment 9 with Reproduction Restrictions
13. Reproduction Restrictions According to Disc Contents/Types
14. Installation of Filter Driver 1. Hardware Configuration A reproduction control method provided by an embodiment of the present invention is implemented as a program executed as a filter driver installed in a personal computer.

First of all, as a hardware configuration of the embodiment, FIG. 1 shows a hardware configuration including a personal computer 1 and a disc drive apparatus 2 connected to the personal computer 1 as an external device.

It is to be noted that the disc drive apparatus 2 can also be embedded in the personal computer 1 instead of being connected to the personal computer 1 as an external device.

As shown in the figure, the personal computer 1 includes a CPU (Central Processing Unit) 11 and a memory 12, which serve as core members of the personal computer 1.

The CPU 11 is a member for executing a variety of programs such as basic software (OS: Operating System), application programs and driver software. The memory 12 includes memory areas such as the so-called ROM, the so-called RAM and the so-called flash ROM, which are used by the CPU 11.

The ROM of the memory 12 is a memory area used for storing, among others, a basic operating program, a variety of processing constants and set information.

The RAM of the memory 12 is a memory area used for storing information necessary for various kinds of processing, used for buffering data, used as an extension of a work area of the CPU 11 and used for a variety of other purposes according to processing carried out by the CPU 11.

The flash ROM of the memory 12 is used as a storage area, in which the OS and application software may be installed.

An HDD (Hard Disc Drive) 13 is used for a variety of purposes including the use as a storage area for storing a variety of data files and pieces of software such as the OS, application programs and device drivers.

A communication unit 14 is a member functioning as a communication interface for communication of data with an external apparatus connected to the personal computer 1 by radio communication means or a wire, which can be an ordinary public line or a dedicated line.

An interface 15 is an interface board for connecting the personal computer 1 to a peripheral apparatus. The interface 15 conforms to an industry standard such as the IDE (Integrated Device Electronics), the SCSI (Small Computer System Interface), the USB (Universal Serial Bus) and the IEEE 1394. In this embodiment, the disc drive apparatus 2 is connected to the personal computer 1 by the interface 15.

Used by the user, an input unit 16 is an input apparatus including a keyboard, a mouse and other devices.

A display unit 17 is a monitor display unit for displaying an output to the user.

Used for outputting an audio signal as a sound, a speaker unit 18 is a member including a D/A converter, an amplifier and a speaker.

It is to be noted that there is a number of typical conceivable configurations of the personal computer. In addition to the components shown in the figure, the configuration may include for example a flexible-disc drive, a card slot for a PC card or other card media and a special-purpose or general-purpose interface for connecting the personal computer to an external apparatus such as a printer or a scanner.

The disc drive apparatus 2 is an apparatus capable of reproducing and recording data from and to a CD-system disc such as a CD-DA, a CD-ROM, a CD-R or a CD-RW. Of course, the disc drive apparatus 2 can be an apparatus capable of dealing with other kinds of disc media such as a disc conforming to the DVD system.

2. Software Configuration

Figure 2:
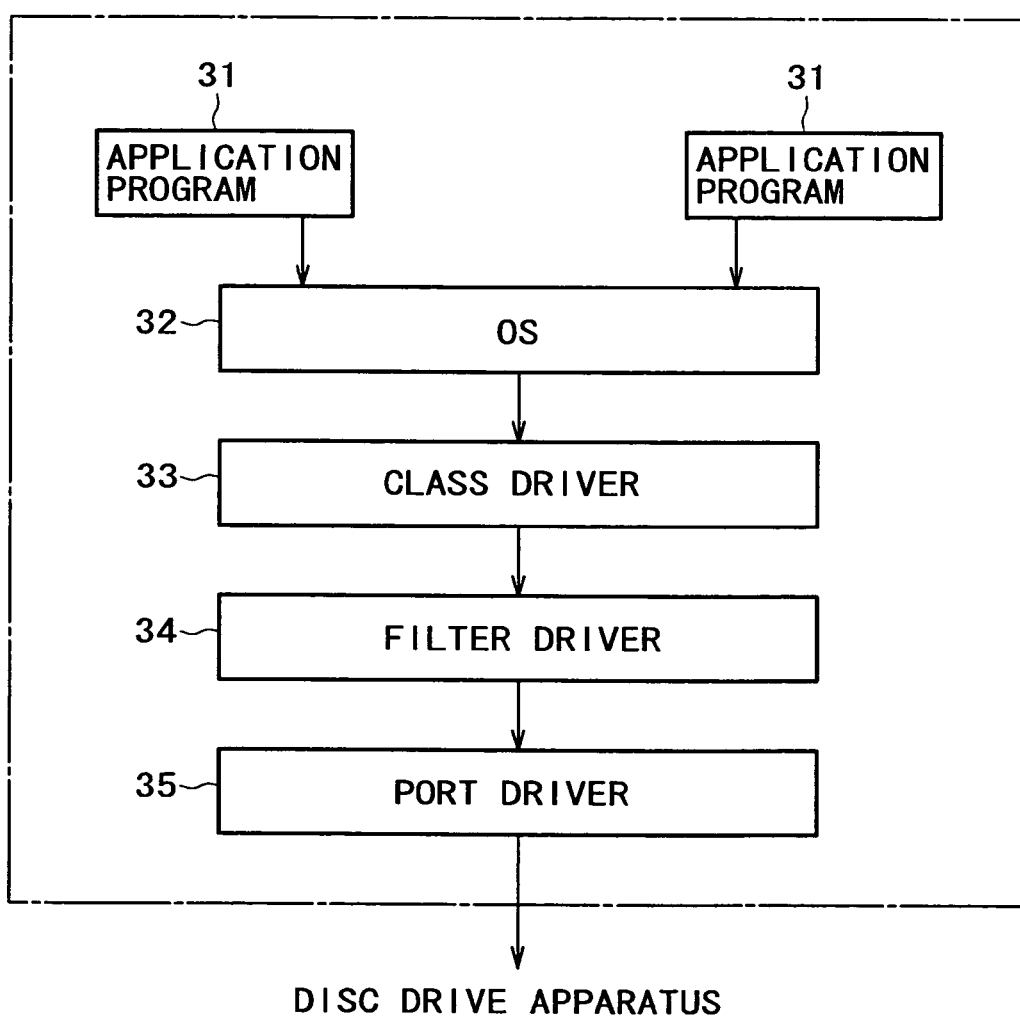
FIG. 2 is an explanatory diagram showing the software structure of the embodiment.

FIG. 2 is an explanatory diagram showing the configuration of software installed in the personal computer 1 to be executed by the CPU 11. The configuration includes members relevant to the embodiment.

One or a plurality of application programs 31 is some application software given opportunities to make accesses to the disc drive apparatus 2. The application program 31 issues a request for a necessary system operation to the OS 32, which serves as the basic software of the personal computer 1. That is to say, the application program 31 operates on the basis of basic operations carried out by the OS 32.

A class driver 33, a filter driver 34 and a port driver 35 are so-called device drivers for the disc drive apparatus 2. The class driver 33, the filter driver 34 and the port driver 35 are hierarchically placed on a low layer of the OS 32.

The class driver 33 carries out a process specific to each of the types of drivers. To put it concretely, the class driver 33 converts an ordinary I/O control instruction received from the processing main member, that is, the OS or an application program, which is placed on a higher layer, into a command for the disc drive apparatus 2. For example, a read request made as an I/O control instruction is converted into a read command for the disc drive apparatus 2.

The port driver 35 is a driver for absorbing a difference in physical level between interfaces. For example, the interface 15 can be an interface conforming to a standard such as the IDE, the SCSI, the USB or the IEEE 1394. Since the port driver 35 makes differences among the standards transparent, at a layer above the port driver 35, a command can be handled without being aware of the differences among the interface types.

The filter driver 34 is a main functional member for implementing the reproduction control method provided by the embodiment. By employing the filter driver 34 on a layer below the class driver 33 of the disc drive apparatus 2, that is, the CD-ROM driver, all commands issued to the disc drive apparatus 2 can be hooked without being aware of the differences in physical level among the interface types.

That is to say, the filter driver 34 is capable of checking all commands issued to the disc drive apparatus 2. In addition, in this embodiment, if a command for sucking up musical data is detected as a command, a predetermined process for protecting a copyright is carried out.

For example, as commands issued by the processing main member including application programs 31 and the OS 32 to the disc drive apparatus 2 to request the disc drive apparatus 2 to carry out a reproduction operation, there are a play command and a read command.

The play command is a command requesting the disc drive apparatus 2 to reproduce musical data or the like from a disc mounted on the disc drive apparatus 2 and then, for example, output reproduced musical data or the like from an output terminal of the disc drive apparatus 2.

On the other hand, the read command is a command requesting the disc drive apparatus 2 to reproduce data from a disc mounted on the disc drive apparatus 2 and then transfer the reproduced data to the personal computer 1. That is to say, the read command is a command making a request for the so-called ripping operation of musical data or the like, that is, an operation to suck up the musical data to the personal computer 1. Thus, by executing the read command, it is quite within the bounds of possibility that a copyright is infringed in a copy operation or the like carried out at a high speed. The filter driver 34 monitors for example the existence of such a copy command or a suck-up command.

3. Operation Sub-embodiment with No Reproduction Restrictions

Figure 3:
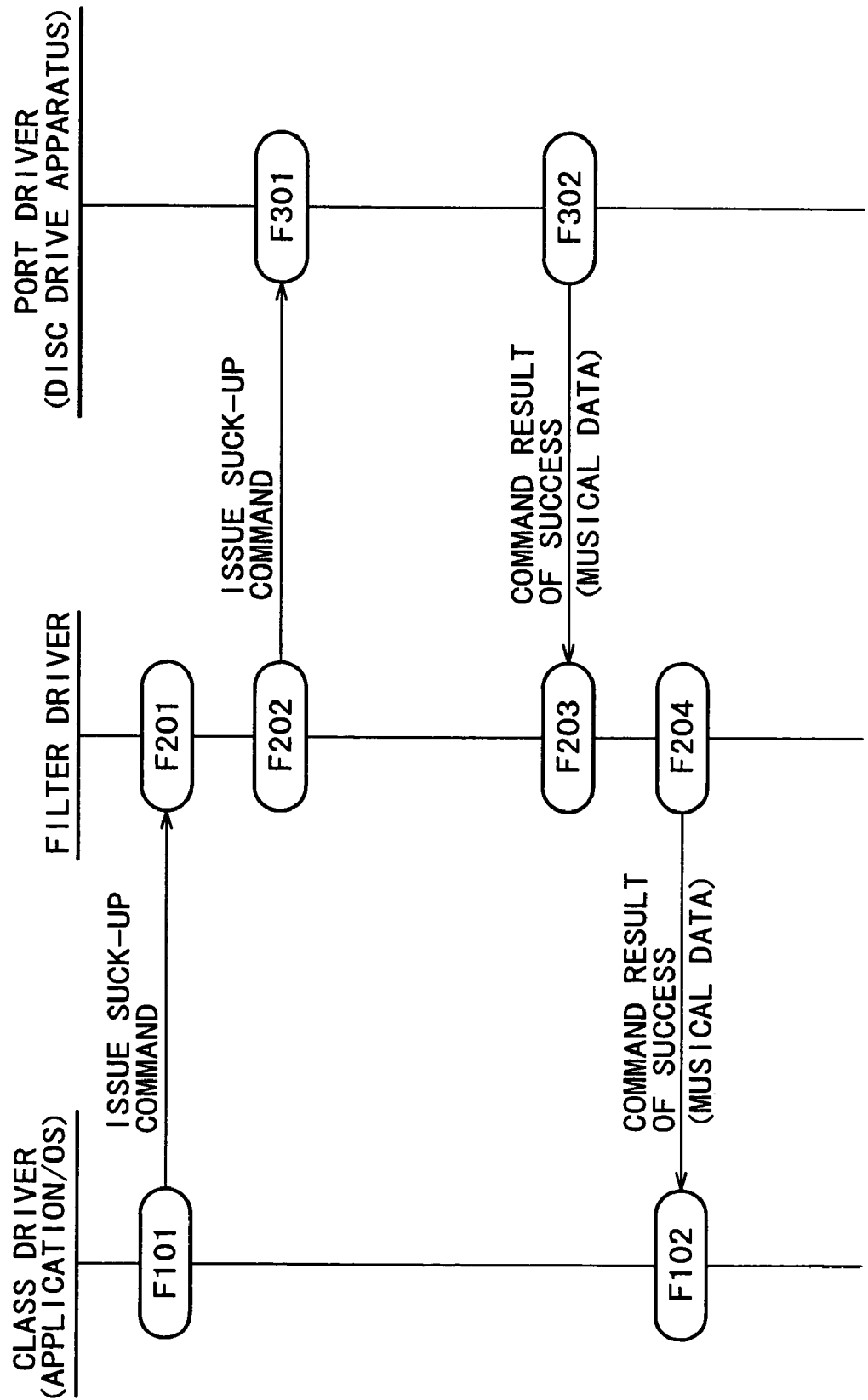
FIG. 3 is an explanatory diagram showing an operation with no restriction imposed on a reproduction process by a filter driver provided by the embodiment.

By giving a variety of examples, the following description explains a reproduction-restricting operation implemented mainly by executing a function of the filter driver 34 in order to protect a copyright. However, the description begins with a case in which the filter driver 34 does not impose a restriction on a reproduction operation as shown in FIG. 3.

Assume that musical data has been recorded on a disc mounted on the disc drive apparatus 2, the disc is a disc conforming to the CD system such as a CD-DA and the musical data is linear PCM data.

It is to be noted that FIGS. 3 to 14 are each a diagram showing a model of an operation sub-embodiment. The process carried out by the class driver 33 is an operation to convert a command issued by an application program 31 or the OS 32 into a command for the disc drive apparatus 2 and pass the command obtained as a result of conversion to the filter driver 34. In addition, the process carried out by the class driver 33 is also an operation to pass a command result or data received from the filter driver 34 to an application program 31 or the OS 32. Since these operations are each an ordinary operation not directly related to the process to protect a copyright, operations to transfer a command and data between the class driver 33 and an application program 31 and between the class driver 33 and the OS 32 are omitted from the figures.

The process carried out by the port driver 35 is an operation to transmit a command transferred from the filter driver 34 to the disc drive apparatus 2 and pass data and a response to a command, which are received from the disc drive apparatus 2, to the filter driver 34. The data is data read out in a reproduction operation carried out by the disc drive apparatus 2 in accordance with the command issued to the disc drive apparatus 2. Since the operation is an ordinary operation not directly related to the process to protect a copyright, operations to transfer a command and data between the port driver 35 and the disc drive apparatus 2 are omitted from the figures.

If the filter driver 34 does not impose a restriction on a reproduction operation, as shown in FIG. 3, the process begins with a step F101 at which a suck-up command is issued from the class driver 33 (originated from the processing main member, which can be an application program 31 or the OS 32 in the processing main member) to the disc drive apparatus 2. Then, at the next step F201, the filter driver 34 receives the suck-up command. Subsequently, at the next step F202, the filter driver 34 passes on the suck-up command to the port driver 35. Then, at the next step F301, the port driver 35 receives the suck-up command.

The port driver 35 transmits the received suck-up command to the disc drive apparatus 2, which then carries out an operation according to the command. That is to say, the disc drive apparatus 2 makes an access to a disc location at an address specified by the suck-up command and carries out an operation to reproduce data. The data (that is, musical data, etc.) read out in the reproduction operation or a command result signal is then output.

Then, at the next step F302, the port driver 35 passes the command result or the musical data received from the disc drive apparatus 2 to the filter driver 34.

Subsequently, at the next step F203, the filter driver 34 receives the command result or the musical data and, at the next step F204, the filter driver 34 transfers the command result or the musical data to the class driver 33.

Then, at the next step F102, the class driver 33 receives the command result or the musical data and passes on the command result or the musical data to the OS 32. For the application program or the OS serving as the processing main member, the operation to suck up the requested musical data is completed.

It is to be noted that, as an actual operation, an application program or the OS makes a request for data in several-block units, which each typically consist of several tens of bytes to several megabytes. Thus, in order to make a request for data with a relatively large size as is the case with musical data, it is necessary to carry out the operation shown in FIG. 3 repeatedly by issuing the suck-up command repeatedly.

In the actual hardware configuration, musical data or other information read out from the disc drive apparatus 2 is stored in a storage area allocated to sucked-up data in the memory 12 (or the HDD 13) on the OS side when the suck-up command is executed.

On the layers of the software structure shown in FIG. 2, a command result is passed. At a point of time information indicating a successful command result is delivered to the application program 31, one access to the disc is considered to have been completed. Thus, after the application program or the OS receives information indicating a successful command result, the application program or the OS again issues a suck-up command making a request for the subsequent data. This operation is carried out repeatedly till the desired data is all sucked up.

4. Operation Sub-embodiment 1 with Reproduction Restrictions

The following description explains operation sub-embodiments carried out by the filter driver 34 to impose a restriction on a reproduction operation in order to protect a copyright.

First of all, operation sub-embodiment 1 imposing a restriction on a reproduction process is explained by referring to FIG. 4. This operation sub-embodiment is an operation carried out by the filter driver 34 to prohibit an operation to suck up musical data.

The filter driver 34 monitors the contents of a command received from the class driver 33.

As shown in FIG. 4, the operation begins with a step F111 at which the class driver 33 (or an application program 31 or the OS 32 in the processing main member) issues a suck-up command to the disc drive apparatus 2. Then, at the next step F211, the filter driver 34 receives the suck-up command. Subsequently, at the next step F212, the filter driver 34 confirms that the received command is a suck-up command.

In this case, at the next step F213, the filter driver 34 carries out a process to generate an error result as a command result instead of passing on the suck-up command to the port driver 35. Then, at the next step F214, the filter driver 34 transmits a signal representing the error command result to the class driver 33.

Subsequently, at the next step F112, the class driver 33 receives the error command result and passes on the result to the OS 32. Receiving the error command result, the application program 31 or the OS 32 serving as the processing main member confirms the fact that it is impossible to suck up the requested musical data, and carries out a required process to handle the error.

That is to say, by carrying out the operation described above, an attempt to suck up musical data from a disc mounted on the disc drive apparatus 2 is prohibited.

By the way, receiving the signal indicating an error command result, the application program or the OS may make a request for the cause of the error.

An operation to make a request for the cause of the error is shown in FIG. 5 as operation sub-embodiment 1' imposing a restriction on a reproduction process.

In the processing carried out in the sequence of steps F111→F211→F213→F214→F112, a signal indicating an error command result is transmitted to the application program or the OS in the same way as the operation shown in FIG. 4.

In the case of operation sub-embodiment 1' imposing a restriction on a reproduction process, however, at the next step F113, the application program or the OS transmits a request sense command as a command making an inquiry about the cause of the error to the disc drive apparatus 2. The class driver 33 transmits this request sense command to the filter driver 34.

On the other hand, the filter driver 34 sets error cause information indicating that a disc has not been mounted after transmitting the error command result at the step F214. The information transmitted as the cause of the error is "No Disc".

Then, at the next step F216, the filter driver 34 receives the request sense command. Subsequently, at the next step F217, the filter driver 34 generates a command result signal in response to the request sense command instead of passing on the request sense command to the port driver 35. The command result signal conveys "No Disc" set above as information on the cause of the error.

Then, at the next step F218, the filter driver 34 transmits the error-cause information "No Disc" as a command result of Success to the class driver 33.

Subsequently, at the next step F114, the class driver 33 receives the error-cause information "No Disc" and passes on this information to the application program or the OS.

Receiving the error-cause information "No Disc", the application program or the OS recognizes that no disc has been mounted on the disc drive apparatus 2 so that data cannot be sucked up. As a result, the access to the disc drive apparatus 2 is put in a shut-down state.

5. Operation Sub-embodiment 2 with Reproduction Restrictions

Operation sub-embodiment 2 with a restriction imposed on reproduction of data is explained by referring to FIG. 6. This operation sub-embodiment does not prohibit the process to suck up musical data, but the filter driver 34 issues a warning to the user to request the user to be aware of protection of a copyright.

The filter driver 34 monitors the contents of a command received from the class driver 33. As shown in FIG. 6, the operation begins with a step F121 at which the class driver 33 (or an application program 31 or the OS 32 in the processing main member) issues a suck-up command to the disc drive apparatus 2. Then, at the next step F221, the filter driver 34 receives the suck-up command. Subsequently, at the next step F222, the filter driver 34 confirms that the received command is a suck-up command.

Then, at the next step F223, the filter driver 34 transfers the suck-up command to the port driver 35. Subsequently, at the next step F321, the port driver 35 receives the suck-up command.

The port driver 35 transmits the received suck-up command to the disc drive apparatus 2, which then carries out an operation according to the command. To put it concretely, the disc drive apparatus 2 makes an access to a disc location at an address specified by the suck-up command and carries out an operation to reproduce data. The data (that is, musical data) read out in the reproduction operation or a command result signal is then output.

On the other hand, after transferring the suck-up command at the step F223, the filter driver 34 carries out a message process at the next step F224. A message process is a process to generate command information for requesting the OS to display a specific message to the user.

Then, at the next step F225, the filter driver 34 transmits a signal representing a message display command to the OS 32.

It is nice to display a message, which typically states "Let us protect a copyright" or "An operation to copy and distribute musical data may infringe a copyright" with the purpose of calling on the user for protection of a copyright or enlightening the protection.

In accordance with the message display command, the OS 32 displays such a message on the display unit 17. Of course, the message can be a voice generated from the speaker unit 18 or a sound that calls the user's attention to the displayed message.

In the mean time, the disc drive apparatus 2 is carrying out a reproduction operation according to the suck-up command. Then, at the next step F322, the port driver 35 receives a signal representing a command result of Success and musical data read out from the disc, passing the signal and the musical data received from the disc drive apparatus 2 to the filter driver 34.

Subsequently, at the next step F226, the filter driver 34 receives the signal representing the command result of Success and the musical data and, at the next step F227, the filter driver 34 transfers the signal and the musical data to the class driver 33.

Subsequently, at the next step F122, the class driver 33 receives the command result and the musical data, passing on the command result and the musical data to the OS 32. At this point of time, for the application program or the OS, the operation to suck up the requested musical data is completed.

By carrying out such an operation, musical data can be sucked up from a disc mounted on the disc drive apparatus 2 and, by displaying a message to call on the user for attention to the handling of the musical data, protection of the copyright can be promoted.

6. Operation Sub-embodiment 3 with Reproduction Restrictions

Operation sub-embodiment 3 with a restriction imposed on reproduction of data is explained by referring to FIG. 7. This operation sub-embodiment does not prohibit the process to suck up musical data, but forces the execution of the process to consume a period of time corresponding to the time it takes to carry out a reproduction process at the 1-time reproduction speed of the disc drive apparatus 2. That is to say, an operation to suck up data at a high speed is disabled due to the fact that it is quite within the bounds of possibility that such an operation infringes a copyright. By carrying out the operation to suck up data at the 1-time reproduction speed, however, the time it takes to copy the data is lengthened so that it is all but out of the bounds of possibility that an operation to illegally copy data is carried out or, being regarded as an ordinary operation to listen to a piece of music, the operation to suck up data at the 1-time reproduction speed is enabled.

The filter driver 34 monitors the contents of a command received from the class driver 33. As shown in FIG. 7, the operation begins with a step F131 at which the class driver 33 (or an application program 31 or the OS 32 in the processing main member) issues a suck-up command to the disc drive apparatus 2. Then, at the next step F231, the filter driver 34 receives the suck-up command. Subsequently, at the next step F232, the filter driver 34 confirms that the received command is a suck-up command.

Then, at the next step F233, the filter driver 34 transfers the suck-up command to the port driver 35. Subsequently, at the next step F331, the port driver 35 receives the suck-up command. The port driver 35 transmits the received suck-up command to the disc drive apparatus 2, which then carries out an operation according to the command. To put it concretely, the disc drive apparatus 2 makes an access to a disc location at an address specified by the suck-up command and carries out an operation to reproduce data. An operation to start outputting data (that is, musical data) read out in the reproduction operation or a command result signal is then started.

On the other hand, after transferring the suck-up command at the step F233, the filter driver 34 starts a process to measure a command execution time at the next step F234. Then, at the next step F235, the filter driver 34 enters a state of waiting for a command result to be transmitted by the disc-drive apparatus 2.

The measured command execution time is defined as a period of time between the transmission of the command making a request for data to the disc drive apparatus 2 and the transmission of the requested data read out from a disc mounted on the disc drive apparatus, 2 and a command result to the filter driver 34 on the assumption that the data is read out in a disc reproduction operation carried out by the disc drive apparatus 2 at the 1-time reproduction speed.

In accordance with a suck-up command, the disc drive apparatus 2 normally reads out data from a disc at a highest speed that can be implemented by the disc drive apparatus 2. Typically, the disc drive apparatus 2 reads out data at the 4-time, 8-time or 16-time reproduction speed. Then, after the requested data has been read out, the data and a command-result are transmitted to the port driver 35.

Subsequently, at the next step F332, the port driver 35 receives the command result and the data read out from the disc from the disc drive apparatus 2, passing on the command result and the data to the filter driver 34. Then, at the next step F236, the filter driver 34 receives the command result of Success and a signal representing the data as well as verifies a count value obtained from the time measurement started at the step F234.

If the measured time is not equal to the time it takes to reproduce data at the 1-time reproduction speed in the disc drive apparatus 2, the filter driver 34 remains in the wait state as it is.

Assume that, at a point of time coinciding with a step F237, the count value reaches the time it takes to reproduce data at the 1-time reproduction speed. In this case, the filter driver 34 terminates the wait state and, at the next step F238, the filter driver 34 passes the command result and the musical data to the class driver 33.

Subsequently, at the next step F132, the class driver 33 receives the command result and the musical data, passing on the command result and the musical data to the OS 32. At this point of time, for the application program or the OS, the operation to suck up the requested musical data is completed.

The filter driver 34 waits for a command result and musical data to be passed from the port driver 35 as described above. It is to be noted, however, that the musical data output by the disc drive apparatus 2 is actually stored in a predetermined storage area of the memory 12 as it is so that the filter driver 34 is not put in a state of waiting for the musical data to be physically transferred by using a buffer or the like.

An operation to pass musical data on each hierarchical layer of the software configuration is carried out by transferring a command result. Thus, by putting a transfer of a command result in a wait state, logically, the operation to pass musical data is also put in a wait state as well. Due to a state of the hardware configuration, however, it is also possible to provide an embodiment in which, in actuality, a transfer of data is physically put on a wait state.

By carrying out such an operation, to an application program or the OS, an operation to reproduce musical data requested by the application program or the OS in the disc drive apparatus 2 is completed in a period of time equivalent to the time it takes to reproduce the data at the 1-time reproduction speed even if the disc drive apparatus 2 actually carries out the operation to reproduce the data from a disc at a several-time reproduction speed.

When the execution of a suck-up command is completed, the application program or the OS again issues another suck-up command in order to make a request for the subsequent musical data. By the same token, the musical data requested by the other suck-up command is also sucked up in a period of time equivalent to the time it takes to reproduce the data at the 1-time reproduction speed.

Thus, virtually, suck-up operations are carried out at the 1-time reproduction speed. If the musical data has a performance time of 5 minutes, for example, the operation to suck up the data is also 5 minutes.

That is to say, by disabling the high-speed suck-up process carried out by execution of a high-speed reproduction operation without regard to performance and operation of the disc drive apparatus as described above, it is possible to restrict operations to infringe a copyright. By regarding a suck-up operation carried out at the 1-time reproduction speed as a copy operation for the user's private use or a normal music-listening operation, on the other hand, convenience can be assured for the user.

By the way, when the disc drive apparatus 2 actually reproduces musical data at the 1-time reproduction speed, a command result and the musical data are transferred to the filter driver 34 at the step F246 at a point time the wait time should be ended or immediately after the point of time. In this case, since the command result and the musical data are transferred to the filter driver 34 after the wait time has been ended, it is needless to say the command result and the musical data can be transferred to the class driver 33 right away.

It is to be noted that, if the waiting time till the step 246 (that is, the measurement time) is set for example at the time it takes to complete a reproduction operation carried out at the 2-time reproduction speed, a suck-up operation can performed at the 2-time reproduction speed.

As for the suck-up time, the reproduction speed's allowable multiplier needs to be set at a value that is determined by a variety of conditions.

7. Operation Sub-embodiment 4 with Reproduction Restrictions

Operation sub-embodiment 4 with a restriction imposed on reproduction of data is explained by referring to FIGS. 8 and 9. In this operation sub-embodiment, a process to suck up musical data is permitted only if the process has been carried out in a period of time corresponding to the N-time reproduction speed of the disc drive apparatus 2.

The N-time reproduction speed can be the 1-time reproduction speed, the 2-time reproduction speed, the 4-time reproduction speed or another several-time reproduction speed. Basically, this operation sub-embodiment prohibits a high-speed suck-up process. Thus, the N-time reproduction speed needs to be set at a value in a range that cannot be said to be a range for a high-speed suck-up process.

This operation sub-embodiment prohibits a high-speed suck-up process accomplished by a high-speed reproduction operation because, by carrying out such a high-speed suck-up process, it is quite within the bounds of possibility that a high-speed copy operation infringes a copyright. By carrying out a suck-up operation at the N-time reproduction speed, however, the time it takes to do the copy operation is lengthened so that it is almost out of the bounds of possibility that an illegal copy operation is performed, or the suck-up operation at the N-time reproduction speed is permitted because the operation is regarded as an ordinary operation to listen to a piece of music.

First of all, FIG. 8 shows a case in which a suck-up operation is permitted. The filter driver 34 monitors the contents of a command received from the class driver 33. As shown in FIG. 8, the operation begins with a step F141 at which the class driver 33 (or an application program 31 or the OS 32 in the processing main member) issues a suck-up command to the disc drive apparatus 2. Then, at the next step F241, the filter driver 34 receives the suck-up command. Subsequently, at the next step F242, the filter driver 34 confirms that the received command is a suck-up command. Then, at the next step F243, the filter driver 34 transfers the suck-up command to the port driver 35.

Subsequently, at the next step F341, the port driver 35 receives the suck-up command. The port driver 35 transmits the received suck-up command to the disc drive apparatus 2, which then carries out an operation according to the command. To put it concretely, the disc drive apparatus 2 makes an access to a disc location at an address specified by the suck-up command and starts an operation to reproduce data. The data (that is, musical data) read out in the reproduction operation or a command result signal is then output.

In accordance with a suck-up command, the disc drive apparatus 2 normally reads out data from a disc at a highest speed that can be implemented by the disc drive apparatus 2. Thus, the time it takes to output data varies in dependence on the high-speed reproduction performance of the disc drive apparatus 2.

Assume for example that the N-time reproduction speed is the 4-time reproduction speed, and the disc drive apparatus 2 connected to the personal computer 1 is an apparatus capable of carrying out a reproduction operation at a maximum speed of 4 times the normal speed. In actuality, the disc drive apparatus 2 is capable of carrying out a reproduction operation at a speed higher than the 4-time reproduction speed but the disc drive apparatus 2 is set so that it is possible to perform only a reproduction operation at the 4-time reproduction speed or lower.

After transferring the suck-up command at the step F243, the filter driver 34 starts a process to measure a command execution time at the next step F244. Then, at the next step F245, the filter driver 34 enters a state of waiting for a command result to be transmitted by the disc-drive apparatus 2.

In the case of a disc drive apparatus 2 having the N-time reproduction speed as described above where N=4, the measured command execution time is defined as a period of time between the transmission of the command making a request for data to the disc drive apparatus 2 and the transmission of the requested data read out from a disc mounted on the disc drive apparatus 2 and a command result to the filter driver 34 on the assumption that the data is read out in a disc reproduction operation carried out by the disc drive apparatus 2 at the 4-time reproduction speed.

Subsequently, at the next step F342, the port driver 35 receives a command result of Success and the musical data read out from the disc from the disc drive apparatus 2, passing on the command result and the data to the filter driver 34. Then, at a step F247, the filter driver 34 receives the command result of Success and the musical data as well as determination as to whether or not the counting operation of the time measurement started at the step F244 has been completed.

The counting operation of the time measurement is completed at a step F246. The filter driver 34 receives the command result of Success and the musical data at the step F247 as described above.

In this case, since the disc drive apparatus 2 carries out a reproduction operation at the 4-time reproduction speed or lower, the step F246 precedes the step F247, that is, by the point of time the filter driver 34 receives the command result of Success and the musical data, the counting operation of the measurement of an execution time equivalent to the execution time for the N-time reproduction speed has been completed.

That is to say, the outcome of the determination, which is formed at the step F247 when the filter driver 34 receives the command result of Success and the musical data, indicates that the state of waiting for an execution equivalent to the execution at the N-time reproduction speed to complete has been ended. In this case, the suck-up operation is permitted.

Then, at the next step F248, the filter driver 34 passes the command result and the musical data to the class driver 33. Subsequently, at the next step F142, the class driver 33 receives the command result and the musical data, passing on the command result and the musical data to the OS 32. At this point of time, for the application program or the OS, the operation to suck up the requested musical data is completed.

On the other and, FIG. 9 shows a case in which a suck-up operation is not permitted. The steps F141, F241, F242, F243, F341, F244 and F245 are the same as their counterparts shown in FIG. 8.

In this case, assume that the disc drive apparatus 2 connected to the personal computer 1 is a disc drive apparatus capable of carrying out a reproduction operation at, for example, an 8-time reproduction speed, a 16-time reproduction speed, a 40-time reproduction speed or another several-time reproduction speed.

Thus, the disc drive apparatus 2 reproduces musical data at a high speed in accordance with a suck-up command, transferring a command result and the musical data to the port driver 35.

Subsequently, at the next step F342, the port driver 35 receives the command result of Success and the musical data read out from the disc from the disc drive apparatus 2, passing on the command result and the data to the filter driver 34. Then, at a step F247, the filter driver 34 receives the command result of Success and the musical data as well as determination as to whether or not the counting operation of the time measurement started at the step F244 has been completed.

In this case, since the disc drive apparatus 2 carries out a reproduction operation at a high speed higher than the 4-time reproduction speed (or the N-time reproduction speed), at the step F247, that is, at the point of time the filter driver 34 receives the command result of Success and the musical data, the counting operation of the time measurement started at the step F244 should have not been completed.

That is to say, at the step F247, the filter driver 34 determines that the reproduction operation should have been carried out at a high speed higher than the 4-time reproduction speed. For this reason, the filter driver 34 makes a decision not to permit the suck-up operation.

Then, at the next step F249, error processing is carried out to give no permission to the suck-up operation. That is to say, as a command result, an error signal is generated.

Subsequently, at the next step F248, the filter driver 34 transmits the error signal as a command result to the class driver 33 instead of passing the command result of Success and the musical data, which has been received from the port driver 35, to the class driver 33.

Subsequently, at the next step F142, the class driver 33 receives the error signal as a command result, passing on the command result to the OS 32. Accordingly, the application program or the OS serving as the processing main member carries out predetermined error processing for the failure of the operation to suck up the requested musical data.

By carrying out the operations described above, an operation to suck up musical data requested by the application program and the OS is permitted only if the disc drive apparatus 2 has reproduced the data from a disc at an average rate equivalent to a speed not higher than the N-time reproduction speed. Thus, an operation to suck up musical data at a speed higher than the N-time reproduction speed is cannot be carried out, making it possible to suppress operations that infringe a copyright. Regarded as a copy operation for the user's private use infringing no copyright or an ordinary operation to listen to a piece of music, on the other hand, an operation to suck up musical data at a speed not higher than the N-time reproduction speed is permitted to provide the user with convenience.

8. Operation Sub-embodiment 5 with Reproduction Restrictions

Operation sub-embodiment 5 with a restriction imposed on reproduction of data is explained by referring to FIG. 10. This operation sub-embodiment does not prohibit the process to suck up musical data from a disc, but converts the musical data into data in a recoverable state so that the personal computer 1 is capable of sucking up the data.

The conversion of musical data into data in a recoverable state typically means a process to encrypt the musical data. That is to say, the personal computer 1 is capable of using musical data sucked up thereto only if the data can be decrypted by using an encryption key so that it is possible to prevent the data from being distributed extensively and hence possible to protect its copyright.

As shown in FIG. 10, the operation begins with a step F151 at which the class driver 33 (or an application program 31 or the OS 32 in the processing main member) issues a suck-up command to the disc drive apparatus 2. Then, at the next step F251, the filter driver 34 receives the suck-up command. Subsequently, at the next step F252, the filter driver 34 confirms that the received command is a suck-up command.

Then, at the next step F253, the filter driver 34 transfers the suck-up command to the port driver 35. Subsequently, at the next step F351, the port driver 35 receives the suck-up command. The port driver 35 transmits the received suck-up command to the disc drive apparatus 2, which then carries out an operation according to the command. To put it concretely, the disc drive apparatus 2 makes an access to a disc location at an address specified by the suck-up command and carries out an operation to reproduce data. The data (that is, musical data) read out in the reproduction operation or a command result signal is then output.

After transmitting the suck-up command to the port driver 35 at the step F253, the filter driver 34 enters a state of waiting for a command result to be transmitted by the port driver 35 at the next step F254.

At a step F352, the port driver 35 receives a command result and the musical data, which has been read out from a disc, from the disc drive apparatus 2, passing the command result and the musical data to the filter driver 34. The command result and the musical data are obtained as a result of the reproduction operation carried out by the disc drive apparatus 2.

At a step F255, the filter driver 34 receives the command result and the musical data. Then, at the next step F256, the musical data is encrypted. To put it in detail, musical data stored in a storage area of the memory 12 is encrypted by using an encryption key.

Then, at the next step F257, the filter driver 34 passes a signal indicating a command result of Success and the musical data to the class driver 33.

Subsequently, at the next step F152, the class driver 33 receives the command result and the musical data, passing on the command result and the musical data to the OS 32. At this point of time, for the application program or the OS, the operation to suck up the requested musical data is completed.

By carrying out the operation described above, the musical data reproduced from a disc mounted on the disc drive apparatus 2 is sucked up to the personal computer 1 in an encrypted state.

Since the musical data in the encrypted state cannot be used as it is, it is necessary to decrypt the data. Thus, the application program 31 is capable of utilizing (that is, reproducing and copying) the musical data only if the application program 31 is capable of recognizing the encryption key. As a result, the musical data cannot be distributed without restrictions.

By the way, in this case, musical data is encrypted for the purpose of prohibiting distribution of the musical data. It is thus necessary to select an encryption key that is suitable for the purpose. For example, it is improper to use a password entered arbitrarily by the user as code data to serve as an encryption key. This is because, if the user distributes the code data serving as an encryption along with musical data for the purpose of preventing the copyright of the musical data from being infringed, anybody will be capable of using the musical data at a distribution site. That is to say, it is feared that the function to protect the copyright is weakened.

In order to solve this problem, it is nice to use code data unique to an apparatus such as the personal computer 1 that will suck up musical data or code data, of which the user cannot thoughtlessly inform another person.

To put it concretely, a value unique to a specific apparatus is used as an encryption key or a part of an encryption key. For example, an ID number unique to the personal computer 1 or the serial number of the personal computer 1 is used. As an alternative, a code value unique to an apparatus is generated from the capacity of an HDD or from the mode number of the CPU and used as an encryption key. In this case, the personal computer 1 completing an operation to suck up musical data encrypted by using the encryption key is capable of recognizing the code value used as the encryption key. Thus, the personal computer 1 is capable of decrypting the encrypted musical data. It is needless to say that the filter driver also generates an encryption key and carries out an encryption process in accordance with the same rule.

In addition, a number that the user does not want to be leaked to another person can be used as an encryption key for encrypting musical data and, when the musical data is utilized, the user is requested to enter the number. An example of such a number is the number of a credit card owned by the user.

By setting the encryption number in this way, the function to protect copyrights can be strengthened.

In the operation sub-embodiment explained by referring to FIG. 10, an encryption process is carried out as a process to convert musical data into data in a recoverable state. It is to be noted, however, that the conversion process is not limited to the encryption process.

For example, it is possible to carry out an interleave process based on a predetermined algorithm to change the locations of pieces of data. A rule for changing the locations of pieces of data is a rule that only a personal computer 1 completing a suck-up operation is capable of recognizing as is the case with the encryption key described above. Thus, only the personal computer 1 is capable of de-interleaving interleaved musical data and using the musical data.

In addition, as an example of the process to convert musical data into data in a recoverable state, it is possible to think of a process in which dummy data is inserted into a musical data sequence in accordance with a predetermined rule. Of course, in this case, as a rule for inserting dummy data into a musical data sequence, a rule that only a personal computer 1 completing a suck-up operation is capable of recognizing is appropriate.

9. Operation Sub-embodiment 6 with Reproduction Restrictions

Operation sub-embodiment 6 explained by referring to FIG. 11 also converts musical data into other data before sucking up the data into a personal computer 1. In this operation with a restriction imposed on the reproduction operation, however, the musical data is converted into data in an irrecoverable state before sucking up the data into the personal computer 1. In operation sub-embodiment 6 with a reproduction restriction imposed on the reproduction operation, the musical data in an irrecoverable state can be used as it is without being subjected to a recovery process. In operation sub-embodiment 7 with a restriction imposed on the reproduction operation, on the other hand, musical data is converted into data in an irrecoverable and unusable state so that, virtually, the operation to suck up the musical data is prohibited. Operation sub-embodiment 7 will be described after operation sub-embodiment 6.

In operation sub-embodiment 6 with a restriction imposed on the reproduction operation, a process to convert musical data into data in an irrecoverable state means for example a process to deteriorate the sound quality of the musical data. The original high quality musical data cannot be recovered from the deteriorated data but the data in the deteriorated state can be used as a source in a copy operation or the like. Of course, the deterioration of musical data is bound up with prevention of the musical data from being extensively distributed through sales of its copies or the like and thus implements the protection of the copyright of the data.

The filter driver 34 monitors the contents of a command received from the class driver 33. As shown in FIG. 11, the operation begins with a step F161 at which the class driver 33 (or an application program 31 or the OS 32 in the processing main member) issues a suck-up command to the disc drive apparatus 2. Then, at the next step F261, the filter driver 34 receives the suck-up command. Subsequently, at the next step F262, the filter driver 34 confirms that the received command is a suck-up command.

Then, at the next step F263, the filter driver 34 transfers the suck-up command to the port driver 35. Subsequently, at the next step F361, the port driver 35 receives the suck-up command. The port driver 35 transmits the received suck-up command to the disc drive apparatus 2, which then carries out an operation according to the command.

After transmitting the suck-up command to the port driver 35 at the step F263, the filter driver 34 enters a state of waiting for a command result to be transmitted by the port driver 35 at the next step F264.

At a step F362, the port driver 35 receives a signal representing a command result of Success and the musical data, which has been read out from a disc, from the disc drive apparatus 2, passing the command result and the musical data to the filter driver 34. The command result and the musical data are obtained as a result of the reproduction operation carried out by the disc drive apparatus 2.

At a step F265, the filter driver 34 receives the command result and the musical data. Then, at the next step F266, the musical data is subjected to a conversion process.

The conversion process is a process to deteriorate the sound quality of the musical data. To put it concretely, the process can be any ones of the following conceivable processes:

A filtering process for filtering out high-frequency characteristics. Examples of this filtering process are a low-pass filter process and a band-pass filter process.

A filtering process for filtering out low-frequency characteristics. Examples of this filtering process are a high-pass filter process and a band-pass filter process.

A volume limiter process for shrinking the dynamic range.

A process for changing less significant bits of each sample of the data to a fixed value or a random number in order to virtually reduce the number of quantization bits.

A process for adding a noise component such as a component of the white noise.

A process for converting stereo musical data into monophonic musical data.

Typically, one or more of the above processes are carried out to convert musical data into other musical data with a deteriorated sound quality.

After the conversion process is completed, the filter driver 34 passes a signal indicating the command result of Success and the musical data to the class driver 33 at the next step F267.

Subsequently, at the next step F162, the class driver 33 receives the command result and deteriorated musical data, passing on the command result and the musical data to the OS 32. At this point of time, for the application program or the OS, the operation to suck up the requested musical data is completed.

By carrying out the operation as described above, musical data reproduced from a disc mounted on the disc drive apparatus 2 is sucked up to the personal computer 1 in a state of a deteriorated sound quality.

Then, the personal computer 1 can utilize the musical data in a state of a deteriorated sound quality. That is to say, for private use, the musical data in a state of a deteriorated sound quality is not such a big problem. However, the musical data in a state of a deteriorated sound quality is not suitable for copyright-infringing actions such as operations to make a profit by copying and distributing the musical data.

10. Operation Sub-embodiment 7 with Reproduction Restrictions

Operation sub-embodiment 7 explained by referring to FIG. 12 also converts musical data into other data before sucking up the data into a personal computer 1. To be more specific, in this operation with a restriction imposed on the reproduction operation, the musical data is converted into data in an irrecoverable state before sucking up the data into the personal computer 1. In operation sub-embodiment 7 with a restriction imposed on the reproduction operation, however, the musical data in an irrecoverable state cannot be used at all so that, virtually, this operation is equivalent to a prohibition of a suck-up process.

In operation sub-embodiment 7 with a restriction imposed on the reproduction operation, a process to convert musical data into data in an irrecoverable state means a process to secretly substitute other data for the musical data. That is to say, the data sucked up into the personal computer 1 is the substitute for the musical data and the substitute is data completely different from the original musical data. In other words, this operation is not an operation to suck up the musical data into the personal computer 1.

The filter driver 34 monitors the contents of a command received from the class driver 33. As shown in FIG. 12, the operation begins with a step F171 at which the class driver 33 (or an application program 31 or the OS 32 in the processing main member) issues a suck-up command to the disc drive apparatus 2. Then, at the next step F271, the filter driver 34 receives the suck-up command. Subsequently, at the next step F272, the filter driver 34 confirms that the received command is a suck-up command.

Then, at the next step F273, the filter driver 34 transfers the suck-up command to the port driver 35. Subsequently, at the next step F371, the port driver 35 receives the suck-up command. The port driver 35 transmits the received suck-up command to the disc drive apparatus 2, which then carries out an operation according to the command.

After transmitting the suck-up command to the port driver 35 at the step F273, the filter driver 34 enters a state of waiting for a command result to be transmitted by the port driver 35 at the next step F274.

At a step F372, the port driver 35 receives a signal representing a command result of Success and the musical data, which has been read out from a disc, from the disc drive apparatus 2, passing the command result and the musical data to the filter driver 34. The command result and the musical data are obtained as a result of the reproduction operation carried out by the disc drive apparatus 2.

At a step F275, the filter driver 34 receives the command result and the musical data. Then, at the next step F276, the musical data is subjected to a conversion process.

The conversion process is a process to replace the musical data with other data. To put it concretely, the process can be any conceivable process to convert the musical data into any one of the following pieces of data:

All-zero data (data of a soundless state)

Fixed audio data such as data having a sine curve with a fixed frequency

Random audio data

Audio data of a message enlightening protection of a copyright and indicating a reason for prohibition of the suck-up operation Thus, the filter driver 34 replaces the musical data with one of the pieces of data described above. After the conversion process is completed, the filter driver 34 passes a signal indicating the command result of Success and the secretly substitute data to the class driver 33 at the next step F277.

Subsequently, at the next step F172, the class driver 33 receives the command result and the substitute data, passing on the command result and the substitute data to the OS 32. At this point of time, for the application program or the OS, the operation to suck up the requested musical data is completed.

By carrying out the operation as described above, musical data is reproduced from a disc mounted on the disc drive apparatus 2, but the data sucked up to the personal computer 1 is not the original musical data. Thus, the operation to suck up musical data can virtually be prohibited and an action to infringe a copyright can be avoided.

11. Operation Sub-embodiment 8 with Reproduction Restrictions

Operation sub-embodiment 8 is explained by referring to FIG. 13. In this operation sub-embodiment, the contents of a command issued to the disc drive apparatus 2 are changed so that the operation to suck up data requested by an application program and the OS is disabled. Thus, this operation sub-embodiment is virtually equivalent to an operation for prohibiting a suck-up operation.

The filter driver 34 monitors the contents of a command received from the class driver 33. As shown in FIG. 13, the operation begins with a step F181 at which the class driver 33 (or an application program 31 or the OS 32 in the processing main member) issues a suck-up command to the disc drive apparatus 2. Then, at the next step F281, the filter driver 34 receives the suck-up command. Subsequently, at the next step F282, the filter driver 34 confirms that the received command is a suck-up command.

Then, at the next step F283, the filter driver 34 changes the contents of the command after the command has been confirmed to be a suck-up command. To put it in detail, the suck-up command is changed to a read command specifying an address from which data is to be read out from a disc mounted on the disc drive apparatus 2.

Thus, the filter driver 34 carries out a process to change the address specified by the suck-up command. For example, the filter driver 34 gives an offset to the specified address or replaces the specified address with an address set at random.

If the suck-up command is a command specifying the start address of musical data to be read out and the amount of the musical data, the filter driver 34 may reduce the amount. If the suck-up command is a command specifying "10 blocks starting from address x", for example, the filter driver 34 changes the command to another command specifying "3 blocks starting from address x".

After carrying out the process to change the command, at the next step F284, the filter driver 34 transfers the suck-up command to the port driver 35. Subsequently, at the next step F381, the port driver 35 receives the suck-up command.

The port driver 35 transmits the received suck-up command to the disc drive apparatus 2, which then carries out a reproduction operation according to the suck-up command.

After transmitting the suck-up command to the port driver 35 at the step F284, the filter driver 34 enters a state of waiting for a command result to be transmitted by the port driver 35 at the next step F285.

At a step F382, the port driver 35 receives a signal representing a command result of Success and the musical data, which has been read out from a disc, from the disc drive apparatus 2, passing the command result and the musical data to the filter driver 34. The command result and the musical data are obtained as a result of the reproduction operation carried out by the disc drive apparatus 2.

At a step F286, the filter driver 34 receives the command result and the musical data. Then, at the next step F287, the command result and the musical data are passed on to the class driver 33.

Subsequently, at the next step F182, the class driver 33 receives the command result of Success and the read out musical data, passing on the command result and the replacement data to the OS 32. At this point of time, for the application program or the OS, the operation to suck up the requested musical data is completed.

By carrying out the operation as described above, to the application program or the OS, the operation to suck up is normally completed. In actuality, however, the data sucked up to the personal computer 1 is data stored at an address not specified in the original suck-up command or data with a missing portion. Thus, the data sucked up to the personal computer 1 is not musical data sucked up normally. As a result, the operation to suck up musical data can virtually be prohibited and an action to infringe a copyright can be avoided.

In this operation sub-embodiment, the disc drive apparatus 2 reproduces data different from data requested by an application program or the OS but sets the command result at the value of "Success". Note, however, that it is also possible to conceive a scheme in which the contents of the suck-up command can be changed so that the disc drive apparatus 2 transmits a command result of Error.

That is, by changing an address value specified in a suck-up command to a value that never exists on a disc as an address, the disc drive apparatus 2 becomes incapable of reproducing data from the disc. By adopting this technique, the operation to suck up musical data can also be prohibited.

12. Operation Sub-embodiment 9 with Reproduction Restrictions

Operation sub-embodiment 9 is explained by referring to FIG. 14. In this operation sub-embodiment, the suck-up command issued to the disc drive apparatus 2 is changed so that the operation to suck up data requested by an application program and the OS is disabled. That is to say, the suck-up command is changed to another command, which is then issued to the disc drive apparatus 2. Naturally, the disc drive apparatus 2 does not carry out the reproduction operation requested by the application program or the OS. Thus, this operation sub-embodiment is virtually equivalent to an operation for prohibiting a suck-up operation.

The filter driver 34 monitors the contents of a command received from the class driver 33. As shown in FIG. 14, the operation begins with a step F191 at which the class driver 33 (or an application program 31 or the OS 32 in the processing main member) issues a suck-up command to the disc drive apparatus 2. Then, at the next step F291, the filter driver 34 receives the suck-up command. Subsequently, at the next step F292, the filter driver 34 confirms that the received command is a suck-up command.

Then, at the next step F293, the filter driver 34 changes the contents of the command after the command has been confirmed to be a suck-up command. To put it in detail, the suck-up command (or the read command) is changed to a replacement command. For example, the filter driver 34 changes the suck-up command to an eject command, which is a command to eject a disc from the disc drive apparatus 2.

After carrying out the process to change the command, at the next step F294, the filter driver 34 transfers the replacement command to the port driver 35. Subsequently, at the next step F391, the port driver 35 receives the replacement command.

The port driver 35 transmits the received replacement command, which is an eject command in this case, to the disc drive apparatus 2. The disc drive apparatus 2 then carries out an operation according to the eject command. To put it concretely, the disc drive apparatus 2 carries out an operation to eject the disc.

After transmitting the replacement command to the port driver 35 at the step F294, the filter driver 34 enters a state of waiting for a command result to be transmitted by the port driver 35 at the next step F295.

At a step F392, the port driver 35 receives a signal representing a command result of Success indicating a successful completion of the eject operation from the disc drive apparatus 2, passing the command result to the filter driver 34.

At a step F296, the filter driver 34 receives a signal representing the command result of Success. Then, at the next step F297, the filter driver 34 recognizes that the operation requested by the eject command has been completed and carries out a process for the suck-up command received from the application program or the OS. That is to say, the filter driver 34 generates a signal indicating a command result of Error in response to the suck-up command. Then, at the next step F298, the filter driver 34 passes the signal indicating a command result of Error to the class driver 33.

Subsequently, at the next step F192, the class driver 33 receives the command result of Error, passing on the command result to the OS 32. The application program or the OS recognizes that the execution of the command to suck up the requested musical data has ended in a failure and carries out a predetermined error-handling process.

By carrying out the operation as described above, for the application program or the OS, the operation to suck up the requested musical data is completed. That is to say, the musical data could not be obtained and, accordingly, its copyright is protected.

It is to be noted that the suck-up command can be changed to not only an eject command, but also another command.

Conceivable examples of the other command are a command to turn off the power of the disc drive apparatus 2 and a variety of commands other than the command making a request for reproduction of data.

13. Reproduction Restrictions According to Disc Contents/Types

In the sub-embodiments of operation described above, the filter driver 34 monitors a command received from the class driver 33. If the command is a suck-up command, a process to protect a copyright is carried out so that an action to infringe a copyright can be avoided or suppressed. The suck-up command is a command making a request for an operation to read out linear PCM audio data from a disc such as a CD-DA.

However, the process to protect a copyright is not necessarily required for all pieces of musical data. In some cases, it is rather appropriate not to carry out the process for the sake of the user convenience. Of course, there is also a case in which the owner of the copyright does not desire a process to impose a restriction on reproduction operation.

For these reasons, typically, information such as a disc title or a disc type can be used in formation of a determination as to whether or not it is necessary to carry out the process of imposing a restriction on a reproduction operation as described above.

In the case of a CD-DA or the like, for example, individual titles can be identified from information recorded on the disc. Examples of the information are an ISRC, a TOC and a catalog number. The titles are used for distinguishing musical CD albums from each other. The TOC is information recorded as reproduction management information. The TOC includes the number of tracks and the address of each of the tracks. A TOC can be used for identifying a title because different musical albums by no means have TOC contents identical with each other completely.

In a software program functioning as the filter driver 34, a title of each disc serving as a target of the copyright protection is set in advance. As an alternative, a title of each disc not serving as a target of the copyright protection can also be set in advance.

With such titles set in advance, it is possible to determine as to whether or not a disc mounted on the disc drive apparatus 2 is a target of the copyright protection by referring to information usable for identifying a title recorded on the disc at a time the disc is mounted on the disc drive apparatus 2. The filter driver 34 carries out a process to impose a restriction on a reproduction operation only if the disc mounted on the disc drive apparatus 2 is found to be a target of the copyright protection. If the disc mounted on the disc drive apparatus 2 is not a target of the copyright protection, on the other hand, no restriction is imposed on a reproduction operation as shown in FIG. 3.

In addition, it is conceivable to determine as to whether or not a disc mounted on the disc drive apparatus 2 is a target of the copyright protection by referring to information usable for identifying the type of the disc itself instead of identifying the title of the disc. For example, it is possible to conceive a copyright protection scheme in which the filter driver 34 carries out a process to impose a restriction on a reproduction operation if the disc mounted on the disc drive apparatus 2 is a CD-DA. If the disc mounted on the disc drive apparatus 2 is a CD-ROM, a CD-R or a CD-RW, on the other hand, the filter driver 34 does not carry out a process to impose a restriction on a reproduction operation.

In addition, it is also necessary to determine as to whether or not the process to impose a restriction on a reproduction operation is to be carried out for any disc on the basis of a variety of conditions and main applications of the disc. The conditions include the state of the technology, a social condition and a variety of disc popularization states.

14. Installation of Filter Driver

By the way, in order to carry out the process to impose a restriction on a reproduction operation as described above, it is necessary to install the filter driver 34 in the personal computer 1.

In addition, the filter driver 34 is meaningless unless the filter driver 34 functions against a person who contemplates infringement of a copyright. It is thus desirable to automatically install the filter driver 34 without the user's awareness.

It is nice to install the filter driver 34 automatically by using autorun means, software activated by the autorun means or another software installer.

When the OS or an application program is installed from a recording medium or through a communication line or when the software version is upgraded, installation of the filter driver 34, which is also an actual software program, at the same time is also conceivable.

As an alternative, the manufacturer of the disc drive apparatus 2 may present a filter driver 34 embedded in advance in device driver software presented to the user as a CD-ROM or the like along with the disc drive apparatus 2.

In addition, a CD-EXTRA is known as an implementation of a CD manufactured for musical use. The CD-EXTRA is used for recording computer software separately from audio data. Thus, musical CDs are sold as CD-EXTRAs, which each include a filter driver 34 recorded thereon in advance and an installer also recorded thereon in advance. By purchasing such a CD-EXTRA, when musical data is reproduced from the disc, an operation can be carried out so that the filter driver 34 is installed automatically.

In the case of a CD-EXTRA, for example, it is possible to conceive a configuration in which a filter driver 34 and its installer are mixed in a data file included in the CD-EXTRA as an additional file for entertainment.

In addition, a manufacturer of hardware such a personal computer may generally sell the personal computer including a filter driver 34 installed therein in advance in collaboration with a manufacturer of software such as an OS and application programs.

By the way, if the filter driver 34 is merely a filter driver, a user skilled in the art may remove the filter driver 34 with ease. If the filter driver 34 is removed, than such a user can make a self-repairing program allowing restoration to be automatically carried out by the user itself. With such a self-repairing program created in advance, uninstallation cannot be carried out with ease, giving rise to a condition desirable for protection of copyrights.

As described above, the reproduction control methods provided by the embodiments are implemented by a program as the filter driver 34 to carry out operations of avoiding and suppressing infringement of copyrights. Of course, by using a recording medium for storing the program as the filter driver 34, the filter driver 34 and, hence, a function for avoiding and suppressing infringement of copyrights can be made popular.

In addition, if the filter driver 34 can be installed in a personal computer automatically, ordinary users do not need to carry out any difficult operations to install the filter driver 34. Furthermore, since the filter driver 34 is included in a physical driver layer, it is difficult for the ordinary users to fumble with the filter driver 34. Moreover, with the filter driver 34 removed, if the user makes a self-repairing program allowing restoration to be automatically carried out by the user itself, the function to protect copyrights can be implemented with a high level of solidity.

Thus, it is possible to avoid a copy operation using typically a personal computer by reproduction of a content with a protected copyright from a disc mounted on the disc drive apparatus 2 such as a CD-ROM drive. A particular example of the copy operation is a high-speed copy operation or the like. As a result, the copyright can be protected effectively.

It is to be noted that, while the sub-embodiments have been explained by assuming that data is sucked up from a disc drive apparatus such as a CD-ROM drive, the present invention can be applied to control of reproduction operations (or suck-up operations) of data from a DVD driver, a card-media driver and a variety of other media reproduction apparatus.

In addition, while the sub-embodiments impose a restriction on a reproduction operation in order to protect a copyright for musical data, which is linear PCM data having a CD format, the present invention can also be applied to operations of sucking up musical data compressed by adoption of an MPEG audio technique or an ATRAC technique and data requiring copyright protection. Examples of the data requiring copyright protection are image data, text data and program data.

In addition, the recording medium provided by the present invention is a recording medium for recording a program as the filter driver 34. Examples of the recording medium used for installation of the filter driver 34 are discs such as the CD-EXTRA and the CD-ROM, discs conforming to the DVD system, memory cards using non-volatile memories, magnetic memory media such as flexible discs and an HDD employed in the personal computer 1 in which the filter driver 34 is to be installed.

As is obvious from the above description, in accordance with the present invention, it is possible to impose a restriction on an operation carried out by an information-processing apparatus such as a personal computer to suck up data such as a piece of music, which requires protection of a copyright, from a recording medium such as a CD-DA by execution of: a monitoring procedure for monitoring a command issued by a processing main member of an information-processing apparatus such as an application program or an OS to a media reproduction apparatus such as a disc drive apparatus in order to read out data recorded on a recording medium mounted on the media reproduction apparatus in a predetermined format; and a copyright protection execution procedure for carrying out a process to protect a copyright if the monitoring procedure detects the issuance of a command to read out data recorded on the recording medium in a predetermined format.

The reproduction control to impose a suck-up restriction on a reproduction operation is implemented by a program running on the information-processing apparatus in order to realize copyright protection more general than a copy protection technique implemented by devising the media (such as a CD) itself. That is to say, the more general copyright protection technique can be applied effectively to discs such as CDs, to which any copy protection technique is not applicable because these CDs were manufactured and sold in the past. Since the more general copyright protection technique can be implemented without adopting methods such as the copy protection technique, which does not conform to the CD standards or the like, there is no compatibility problem.

In addition, there is further provided a determining procedure for determining as to whether or not a process for protecting a copyright is required on the basis of the contents or the type of a recording medium mounted on the media reproduction apparatus. If a result of the determination formed in the determining procedure indicates that the process for protecting a copyright is required, the monitoring procedure and the copyright protection execution procedure are executed so that the copyright protection execution procedure can be made effective or ineffective for, for example, a disc of a specific type or a CD with a specific title in order to keep up with requirements in a flexible manner.

In accordance with the copyright protection execution procedure, it is possible to carry out a process to transmit a read-error signal to the processing main member without transmitting a read command to the media reproduction apparatus so as to prohibit an operation to suck up data into the information-processing apparatus in an attempt to protect a copyright.

In this case, a signal indicating that no disc has been mounted on the media reproduction apparatus can be transmitted to the processing main member.

In accordance with the copyright protection execution procedure, it is also possible to carry out a process to transmit a read command to the media reproduction apparatus and transmit a signal to the processing main member to request the processing main member that a message be output to the user. In this way, the user can be requested to confirm the protection of a copyright and it is thus possible to exhibit an effect of suppressing the infringement of a copyright.

In accordance with the copyright protection execution procedure, it is also possible to carry out a process to transmit a read command to the media reproduction apparatus and pass data read out from the media reproduction apparatus to the processing main member after the lapse of a predetermined wait state. In this way, virtually, only a low-speed suck-up operation such as a 1-time reproduction (suck-up) speed operation can be carried out. That is to say, a high-speed suck-up operation cannot be performed. Thus, infringement of a copyright can be avoided. In addition, since a reproduction operation equivalent to an operation at the 1-time reproduction speed can be carried out, the present invention can be applied normally to applications such as an operation carried out by the user to listen to a piece of music. Thus, the user's convenience can be sustained.

In accordance with the copyright protection execution procedure, it is also possible to carry out a process to transmit a read command to the media reproduction apparatus and pass data read out from the media reproduction apparatus to the processing main member only if an average speed to read out the data from the media reproduction apparatus is lower than a predetermined speed. Also in this case, virtually, only a low-speed suck-up operation such as a 1-time reproduction (suck-up) speed operation can be carried out. That is to say, a high-speed suck-up operation cannot be performed. Thus, infringement of a copyright can be avoided.

In accordance with the copyright protection execution procedure, it is also possible to carry out a process to convert the contents of a read command into another read command, transmit the other read command to the media reproduction apparatus and pass data read out from the media reproduction apparatus in accordance with the other read command to the processing main member. In this way, it is impossible to suck up the data truly requested by the processing main member. It is thus possible to protect a copyright in a state virtually equivalent to a state of prohibiting a suck-up operation.

In accordance with the copyright protection execution procedure, it is also possible to carry out a process to convert a read command itself into another command and transmit a read error signal to the processing main member. It is thus possible to protect a copyright in a state virtually equivalent to a state of prohibiting a suck-up operation.

In accordance with the copyright protection execution procedure, it is also possible to carry out a process to transmit a read command to the media reproduction apparatus, convert all or a portion of data read out from the media reproduction apparatus into other data and transmit the other data to the processing main member. In this way, it is possible to implement a state of prohibiting a suck-up operation or permit a conditional suck-up operation.

The aforementioned process to convert data is a process to convert the data into other data in a recoverable state by carrying out predetermined processing. Thus, an operation to suck up the data can be permitted only if a condition for a data recovery is satisfied. Thus, by carrying out a process to change the locations of pieces of data by execution of predetermined processing or an encryption process by execution of processing using a predetermined encryption key, for example, the original data can be recovered, that is, the sucked-up data can be reproduced normally only by using an apparatus knowing the processing algorithm adopted in the process to change the locations of pieces of data or an apparatus knowing the encryption key, that is, an apparatus to which the encryption key is entered. For example, it is possible to reproduce the data by specifying the information-processing apparatus carrying out the suck-up operation or the user of the apparatus. That is to say, even if the data is copied to discs for distribution to other apparatus or other users, the other apparatus and the other users will not be capable of reproducing the data. Thus, the protection of a copyright is implemented.

The aforementioned process to convert data is a process to convert the data into other data in an irrecoverable state. Thus, since the process to suck up data is permitted only after the data has been deteriorated, a state of prohibiting a suck-up operation can be implemented.

In other words, by carrying out a process to deteriorate the sound quality of an audio signal representing the data, the user is allowed to listen to a reproduced sound, which has been deteriorated to a certain degree, by using an information-processing apparatus. That is to say, there is no problem as far as normal music listening is concerned. Since the data with a sound quality deteriorated to a certain degree is an obstruction to illegal operations such as activities to sell the data by infringing its copyright, however, a state of prohibiting a suck-up operation can be implemented.

In addition, by carrying out a process to secretly substitute data read out from a disc mounted on the disc drive apparatus 2 with other data, virtually, the operation to suck up the data can be prohibited and its copyright can thus be protected.

The invention claimed is:

1. A reproduction control method adopted by an information-processing apparatus to reproduce data from a recording medium mounted on a media reproduction apparatus embedded in or connected to said information-processing apparatus, comprising:

monitoring a command issued by a processing main member of said information-processing apparatus to said media reproduction apparatus to read out content data recorded on said recording medium in a predetermined format;

determining whether or not a process to protect a copyright is required on the basis of the contents or the type of said recording medium mounted on said media reproduction apparatus; and executing a copyright protection procedure to restrict content data from being read if a command to read out the content data recorded on said recording media has been confirmed and if it is determined that said process to protect a copyright is required, and to read out said content data if it is determined that said process to protect a copyright is not required.

2. The reproduction control method according to claim 1, wherein said copyright protection execution procedure transmits a read error signal to said processing main member without passing on said command to read out data from said recording medium to said media reproduction apparatus.

3. The reproduction control method according to claim 1, wherein said copyright protection execution procedure transmits a read error signal and a signal indicating that said recording medium has not been mounted on said media reproduction apparatus to said processing main member without passing on said command to read out data from said recording medium to said media reproduction apparatus.

4. The reproduction control method according to claim 1, wherein said copyright protection execution procedure passes on said command to read out data from said recording medium to said media reproduction apparatus and transmits a signal to said processing main member to request said processing main member that a message be output.

5. The reproduction control method according to claim 1, wherein said copyright protection execution procedure passes on said command to read out data from said recording medium to said media reproduction apparatus and passes said data received from said media reproduction apparatus to said processing main member after a lapse of a predetermined wait time.

6. The reproduction control method according to claim 1, wherein said copyright protection execution procedure passes on said command to read out data from said recording medium to said media reproduction apparatus and passes said data received from said media reproduction apparatus to said processing main member only if an average speed to read out said data is lower than a predetermined speed.

7. The reproduction control method according to claim 1, wherein said copyright protection execution procedure passes on said command to read out data from said recording medium to said media reproduction apparatus and carries out a data conversion process of all or a portion of said data read out by said media reproduction apparatus prior to transmission to said processing main member.

8. The reproduction control method according to claim 7, wherein said data conversion process converts said data into data in a state that allows said data to be recovered by carrying out predetermined processing.

9. The reproduction control method according to claim 8, wherein said predetermined processing changes locations of said data.

10. The reproduction control method according to claim 8, wherein said predetermined processing encrypts said data using a predetermined encryption key.

11. The reproduction control method according to claim 10, wherein, as said encryption key or a part of said encryption key, a value unique to a particular apparatus is used.

12. The reproduction control method according to claim 7, wherein said data conversion process converts said data into data in an irrecoverable state.

13. The reproduction control method according to claim 12, wherein said data conversion process deteriorates the sound quality of said data, which is represented by an audio signal.

14. The reproduction control method according to claim 12, wherein said data conversion process secretly substitutes other data for said original data.

15. The reproduction control method according to claim 1, wherein said copyright protection execution procedure passes on said command to read out data from said recording medium to said media reproduction apparatus after converting the contents of said command and passing said data read out by said media reproduction apparatus in accordance with a command obtained as a result of conversion to said processing main member.

16. The reproduction control method according to claim 1, wherein said copyright protection execution procedure passes on said command to read out data from said recording medium to said media reproduction apparatus after transforming said command into another command and transmitting a read error signal to said processing main member.

17. A recording medium storing a program to cause an information-processing apparatus to perform a method to reproduce data from a recording medium mounted on a media reproduction apparatus embedded in or connected to said information-processing apparatus, the method comprising:
  monitoring a command issued by a processing main member of said information-processing apparatus to said media reproduction apparatus to read out content data recorded on said recording medium in a predetermined format;
  determining whether or not a process to protect a copyright is required on the basis of the contents or the type of said recording medium mounted on said media reproduction apparatus; and
  executing a copyright protection procedure to restrict content data from being read if a command to read out the content data recorded on said recording media has been confirmed and if it is determined that said process to protect a copyright is required, and to read out said content data if it is determined that said process to protect a copyright is not required.

18. The recording medium according to claim 17, wherein said copyright protection execution procedure transmits a read error signal to said processing main member without passing on said command to read out data from said recording medium to said media reproduction apparatus.

19. The recording medium according to claim 17, wherein said copyright protection execution procedure transmits a read error signal and a signal indicating that said recording medium has not been mounted on said media reproduction apparatus to said processing main member without passing on said command to read out data from said recording medium to said media reproduction apparatus.

20. The recording medium according to claim 17, wherein said copyright protection execution procedure passes on said command to read out data from said recording medium to said media reproduction apparatus and transmits a signal to said processing main member to request said processing main member that a message be output.

21. The recording medium according to claim 17, wherein said copyright protection execution procedure passes on said command to read out data from said recording medium to said media reproduction apparatus and passes said data received from said media reproduction apparatus to said processing main member after a lapse of a predetermined wait time.

22. The recording medium according to claim 17, wherein said copyright protection execution procedure passes on said command to read out data from said recording medium to said media reproduction apparatus and passes said data received from said media reproduction apparatus to said processing main member only if an average speed to read out said data is lower than a predetermined speed.

23. The recording medium according to claim 17, wherein said copyright protection execution procedure passes on said command to read out data from said recording medium to said media reproduction apparatus and carries out a data conversion process of all or a portion of said data read out by said media reproduction apparatus prior to transmission to said processing main member.

24. The recording medium according to claim 23, wherein said data conversion process converts said data into data in a state that allows said data to be recovered by carrying out predetermined processing.

25. The recording medium according to claim 24, wherein said predetermined processing changes locations of said data.

26. The recording medium according to claim 24, wherein said predetermined processing encrypts said data using a predetermined encryption key.

27. The recording medium according to claim 26, wherein, as said encryption key or a part of said encryption key, a value unique to a particular apparatus is used.

28. The recording medium according to claim 23, wherein said data conversion converts said data into data in an irrecoverable state.

29. The recording medium according to claim 28, wherein said data conversion process deteriorates the sound quality of said data, which is represented by an audio signal.

30. The recording medium according to claim 28, wherein said data conversion process secretly substitutes other data for said original data.

31. The recording medium according to claim 17, wherein said copyright protection execution procedure passes on said command to read out data from said recording medium to said media reproduction apparatus after converting the contents of said command and passing said data read out by said media reproduction apparatus in accordance with a command obtained as a result of conversion to said processing main member.

32. The recording medium according to claim 17, wherein said copyright protection execution procedure passes on said command to read out data from said recording medium to said media reproduction apparatus after transforming said command into another command and transmitting a read error signal to said processing main member.

33. An information-processing apparatus for reproducing data from a recording medium mounted on a media reproduction apparatus embedded in or connected to said information-processing apparatus, the information-processing apparatus comprising:
  a storage unit for storing a software program for:
    monitoring a command issued by a processing main member of said information-processing apparatus to said media reproduction apparatus to read out content data recorded on said recording medium in a predetermined format,
    determining whether or not a process to protect a copyright is required on the basis of the contents or the type of said recording medium mounted on said media reproduction apparatus, and executing a copyright protection procedure to restrict content data from being read if a command to read out the content data recorded on said recording media has been confirmed and if it is determined that said process to protect a copyright is required, and to read out said content data if it is determined that said process to protect a copyright is not required; and a processor unit for executing the software program.

34. The information-processing apparatus of claim 33, wherein said copyright protection execution procedure transmits a read error signal to said processing main member without passing on said command to read out data from said recording medium to said media reproduction apparatus.

35. The information-processing apparatus of claim 33, wherein said copyright protection execution procedure transmits a read error signal and a signal indicating that said recording medium has not been mounted on said media reproduction apparatus to said processing main member without passing on said command to read out data from said recording medium to said media reproduction apparatus.

36. The information-processing apparatus of claim 33, wherein said copyright protection execution procedure passes on said command to read out data from said recording medium to said media reproduction apparatus and transmits a signal to said processing main member to request said processing main member that a message be output.

37. The information-processing apparatus of claim 33, wherein said copyright protection execution procedure passes on said command to read out data from said recording medium to said media reproduction apparatus and passes said data received from said media reproduction apparatus to said processing main member after a lapse of a predetermined wait time.

38. The information-processing apparatus of claim 33, wherein said copyright protection execution procedure passes on said command to read out data from said recording medium to said media reproduction apparatus and passes said data received from said media reproduction apparatus to said processing main member only if an average speed to read out said data is lower than a predetermined speed.

39. The information-processing apparatus of claim 33, wherein said copyright protection execution procedure passes on said command to read out data from said recording medium to said media reproduction apparatus and carries out a data conversion process of all or a portion of said data read out by said media reproduction apparatus prior to transmission to said processing main member.

40. The information-processing apparatus of claim 39, wherein said data conversion process converts said data into data in a state that allows said data to be recovered by carrying out predetermined processing.

41. The information-processing apparatus of claim 40, wherein said predetermined processing changes locations of said data.

42. The information-processing apparatus of claim 40, wherein said predetermined processing encrypts said data using a predetermined encryption key.

43. The information-processing apparatus of claim 42, wherein, as said encryption key or a part of said encryption key, a value unique to a particular apparatus is used.

44. The information-processing apparatus of claim 40, wherein said data conversion converts said data into data in an irrecoverable state.

45. The information-processing apparatus of claim 44, wherein said data conversion process deteriorates the sound quality of said data, which is represented by an audio signal.

46. The information-processing apparatus of claim 44, wherein said data conversion process secretly substitutes other data for said original data.

47. The information-processing apparatus of claim 33, wherein said copyright protection execution procedure passes on said command to read out data from said recording medium to said media reproduction apparatus after converting the contents of said command and passing said data read out by said media reproduction apparatus in accordance with a command obtained as a result of conversion to said processing main member.

48. The information-processing apparatus of claim 33, wherein said copyright protection execution procedure passes on said command to read out data from said recording medium to said media reproduction apparatus after transforming said command into another command and transmitting a read error signal to said processing main member.

* * * * *